US012795637B2

(12) United States Patent
Mu et al.

(10) Patent No.: US 12,795,637 B2
(45) Date of Patent: Nov. 10, 2026

(54) SEMI-PERSISTENT SCHEDULING CONFIGURATION METHOD AND APPARATUS AND STORAGE MEDIUM

(71) Applicant: Beijing Xiaomi Mobile Software Co., Ltd., Beijing (CN)

(72) Inventors: Qin Mu, Beijing (CN); Xuemei Qiao, Beijing (CN); Kexin Xiong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 387 days.

(21) Appl. No.: 18/682,264

(22) PCT Filed: Aug. 11, 2021

(86) PCT No.: PCT/CN2021/112143

§ 371 (c)(1),
(2) Date: Feb. 8, 2024

(87) PCT Pub. No.: WO2023/015503

PCT Pub. Date: Feb. 16, 2023

(65) Prior Publication Data

US 2025/0008502 A1 Jan. 2, 2025

(51) Int. Cl.

| | |
|---|---|
| ***H04W 4/00*** | (2018.01) |
| ***H04W 72/0446*** | (2023.01) |
| ***H04W 72/11*** | (2023.01) |
| ***H04W 72/21*** | (2023.01) |
| ***H04W 72/231*** | (2023.01) |

(52) U.S. Cl.
CPC ........ *H04W 72/11* (2023.01); *H04W 72/0446* (2013.01); *H04W 72/21* (2023.01); *H04W 72/231* (2023.01)

(58) Field of Classification Search
CPC . H04W 72/11; H04W 72/0446; H04W 72/21; H04W 72/231; H04W 72/1263
See application file for complete search history.

(56) References Cited

U.S. PATENT DOCUMENTS

| | | | | |
|---|---|---|---|---|
| 11,889,538 B2 * | 1/2024 | Gholmieh | ............. | H04W 72/02 |
| 2019/0166621 A1 * | 5/2019 | Yerramalli | .......... | H04W 74/004 |

(Continued)

FOREIGN PATENT DOCUMENTS

| | | |
|---|---|---|
| CN | 102972079 A | 3/2013 |
| CN | 109462839 A | 3/2019 |

(Continued)

OTHER PUBLICATIONS

NEC, "Potential enhancements of NR to support XR services", 3GPP TSG RAN WG1 #106-e, R1-2107158, Aug. 16-27, 2021.

(Continued)

*Primary Examiner* — Thai Dinh Hoang
(74) *Attorney, Agent, or Firm* — Volpe Koenig

(57) ABSTRACT

A method, apparatus, and storage medium for semi-persistent scheduling (SPS) configuration. The SPS configuration method performed by a terminal, and the method includes: determining a predicted delay time of arrival of a data packet within at least one SPS period, and determining a time unit corresponding to the predicted delay time; and configuring the time unit to be a time unit receiving the data packet.

15 Claims, 17 Drawing Sheets

(56) References Cited

U.S. PATENT DOCUMENTS

| | | | | |
|---|---|---|---|---|
| 2020/0092908 | A1* | 3/2020 | Li | H04L 41/08 |
| 2020/0137769 | A1* | 4/2020 | Sun | H04L 5/0037 |
| 2022/0078832 | A1* | 3/2022 | Elshafie | H04L 1/1854 |
| 2023/0198679 | A1* | 6/2023 | Bae | H04L 5/0055<br>370/329 |

FOREIGN PATENT DOCUMENTS

| | | | | | |
|---|---|---|---|---|---|
| CN | 110475362 | A | | 11/2019 | |
| CN | 111010662 | A | * | 4/2020 | H04W 72/52 |
| CN | 111294930 | A | | 6/2020 | |
| CN | 111432480 | A | | 7/2020 | |
| CN | 112351499 | A | | 2/2021 | |
| CN | 112715049 | A | | 4/2021 | |
| JP | 5038491 | B2 | * | 10/2012 | H04W 72/535 |
| WO | 2020/080863 | A1 | | 4/2020 | |

OTHER PUBLICATIONS

International Search Report, PCT/CN2021/112143, May 9, 2022, 4 pgs.

* cited by examiner in response to determining a predicted delay time point of a data packet within at least one SPS period and in response to determining that a duration from the predicted delay time point to an initial position of the SPS period is greater than or equal to a length of one time unit, it is determined that a time unit following a default data packet receiving time unit is the time unit corresponding to the predicted delay time based on the default data packet receiving time unit of the SPS period.

S21

Fig. 5

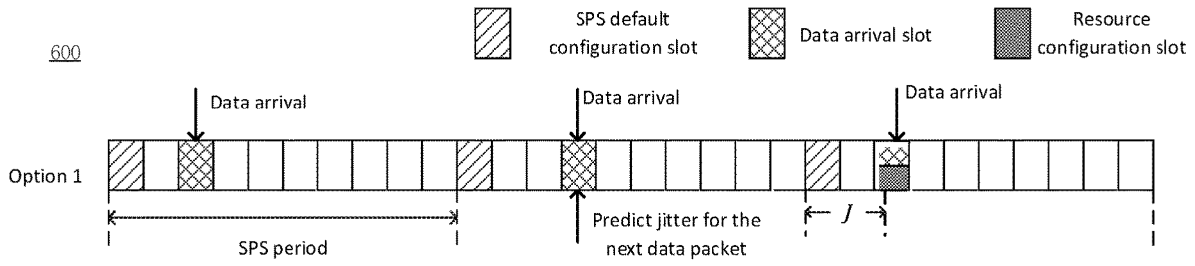

Fig. 6

SEMI-PERSISTENT SCHEDULING CONFIGURATION METHOD AND APPARATUS AND STORAGE MEDIUM

CROSS-REFERENCE TO RELATED APPLICATION

The present application is a U.S. National Phase of International Patent Application Serial No. PCT/CN2021/112143, filed on Aug. 11, 2021. The entire contents of the above-cited application are hereby incorporated by reference in their entirety for all purposes.

BACKGROUND OF THE INVENTION

In some scenarios, data streams are generated periodically; as a result, semi-permanent scheduling/semi-persistent scheduling (SPS) modes are configured for these scenarios. By configuring an SPS period, data is received in slots configured within the SPS period.

SUMMARY OF THE INVENTION

In order to overcome problems existing in the related art, the disclosure provides a semi-persistent scheduling configuration method and apparatus, and a storage medium.

According to a first aspect of an example of the disclosure, an SPS configuration method is provided and applied to a terminal, and the method includes: determining a predicted delay time of arrival of a data packet within at least one SPS period, and determining a time unit corresponding to the predicted delay time; and configuring the time unit to be a time unit receiving the data packet.

According to a second aspect of an example of the disclosure, a semi-persistent scheduling (SPS) configuration method is provided and applied to a radio access network device, and the method includes: determining a predicted delay time of a data packet within at least one SPS period, and determining a time unit corresponding to the predicted delay time; and configuring the time unit to be a time unit sending the data packet.

According to a third aspect of an example of the disclosure, an SPS configuration apparatus is provided, including: one or more processors; and a memory, configured to store executable instructions of the one or more processors; where, the one or more processors are collectively configured to: execute the SPS configuration method described according to the first aspect, or execute the SPS configuration method described according to the second aspect.

According to a fourth aspect of an example of the disclosure, a non-temporary computer-readable storage medium is provided. Instructions in the storage medium, when executed by one or more processors of a mobile terminal, cause the mobile terminal to be capable of executing the SPS configuration method described according to the first aspect, or cause the mobile terminal to be capable of executing the SPS configuration method described according to the second aspect.

It is to be understood that the above general description and the following detailed description are merely for example and explanatory, and cannot limit the disclosure.

BRIEF DESCRIPTION OF DRAWINGS

Accompanying drawings here, which are incorporated in and constitute a part of this specification, illustrate examples consistent with the disclosure and together with the specification, serve to explain the principles of the disclosure.

FIG. 5 is a flow diagram of an SPS configuration method shown according to an example.

FIG. 6 is a schematic diagram of slot resource allocation for an SPS configuration method shown according to an example.

DETAILED DESCRIPTION OF THE INVENTION

Examples will be illustrated in detail here, instances of which are represented in the accompanying drawings. When the following description refers to the accompanying drawings, the same number in the different accompanying drawings represents the same or similar elements unless otherwise indicated. The implementations described in the following examples do not represent all implementations consistent with the disclosure. On the contrary, they are merely examples of an apparatus and method consistent with some aspects of the disclosure as detailed in the appended claims.

The disclosure relates to the technical field of wireless communications, in particular to a semi-persistent scheduling configuration method and apparatus, and a storage medium.

In some scenarios, data streams are generated periodically; as a result, semi-permanent scheduling/semi-persistent scheduling (SPS) modes are configured for these scenarios. By configuring an SPS period, data is received in slots configured within the SPS period.

In some scenarios, data packet transmission further requires low delay. However, large uncertainty of core network link conditions and service characteristics leads to significant jitter delay in the transmission of a data packet. This results in an arrival slot of the data packet being different from a data receiving slot configured in the SPS period, making it impossible to receive the data. In response to determining that the data is received in the next SPS period, it will cause a significant delay in the data packet, which cannot meet the demand for low delay in transmission of the data packet.

Figure 1:
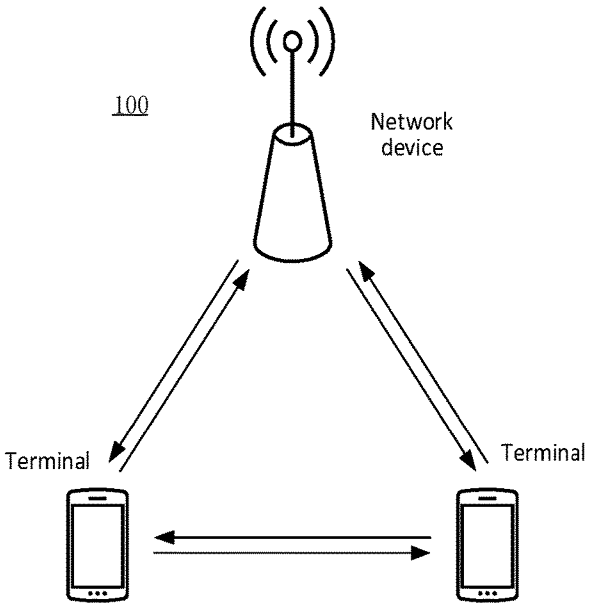
FIG. 1 is a communication system architecture diagram of a network device and a terminal shown according to an example.

FIG. 1 is a communication system architecture diagram of a network device and a terminal shown according to an example. A communication method provided by the disclosure may be applied to the communication system architecture 100 shown in FIG. 1. As shown in FIG. 1, a network side device may send signaling based on an architecture shown in FIG. 1.

It may be understood that communication systems of the network device and the terminal shown in FIG. 1 are merely for schematic illustration, and a wireless communication system may further include other network devices, for example, it may further include a core network device, a wireless relay device, a wireless backhaul device, etc., which is not drawn in FIG. 1. The example of the disclosure does not limit the quantity of the network devices and the quantity of the terminals included in the wireless communication system.

It may be further understood that the wireless communication system in the example of the disclosure is a network providing a wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. A network may be divided into a 2G (generation) network, a 3G network, a 4G network, or a future evolution network, such as a 5G network, according to capacity, speed, delay, and other factors of the different networks. The 5G network may also be called a new radio (NR) network. For convenience of description, the disclosure sometimes may refer to the wireless communication network simply as the network.

Further, the network device involved in the disclosure may also be called a radio access network device. The radio access network device may be: a base station, an evolved node B (base station), a femtocell, an access point (AP) in a wireless fidelity (WIFI) system, a wireless relay node, a wireless backhaul node, a transmission point (TP) or a transmission and reception point (TRP), etc., may further be a gNB in an NR system, or may further be a component or part of a device that constitutes a base station. When it is a vehicle-to-everything (V2X) communication system, the network device may further be a vehicle-mounted device. It is to be understood that a specific technology and a specific device form employed by the network device are not limited in the example of the disclosure.

Further, the terminal involved in the disclosure may also be called a terminal device, user equipment (UE), a mobile station (MS), a mobile terminal (MT), etc., and is a device that provides voice and/or data connectivity to a user. For example, the terminal may be a handheld device and a vehicle-mounted device with a wireless connection function. At present, some examples of the terminal are: a mobile phone, a pocket personal computer (PPC), a palm computer, a personal digital assistant (PDA), a notebook computer, a tablet computer, a wearable device, or the vehicle-mounted device, etc. In addition, when it is a vehicle-to-everything (V2X) communication system, the terminal may further be the vehicle-mounted device. It is to be understood that the specific technology and the specific device form employed by the terminal are not limited in the example of the disclosure.

In the new generation of communication technology, there are some scenarios that periodically generate data streams, such as a mixed reality (XR) scenario. In the XR scenario, the data streams are typically generated periodically, with a common data arrival rate of 45/60/120 frames per second. Thus, a semi-persistent scheduling (SPS) method is more suitable for an XR traffic scenario. The SPS method is used for performing semi-persistent configuration on wireless resources used by the terminal, also known as user equipment (UE), and specified slot resources are periodically allocated to the UE. The radio access network device does not need to re-issue a physical downlink control channel (PDCCH) in this subframe to specify the allocated resources.

Figure 2:
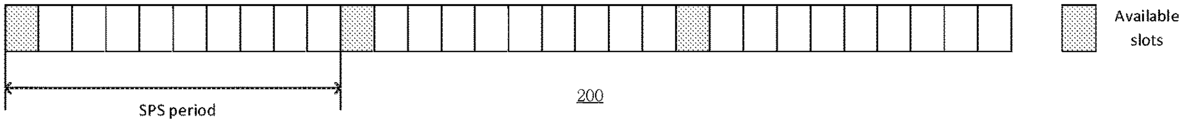
FIG. 2 is a schematic diagram of an SPS period, shown according to an example.

FIG. 2 is a schematic diagram of an SPS period 200 shown according to an example. As shown in FIG. 2, after performing the SPS configuration, there are slots for transceiving data in each SPS period, and UE may receive a data packet in slot resources configured in each SPS for transceiving the data.

Figure 3:
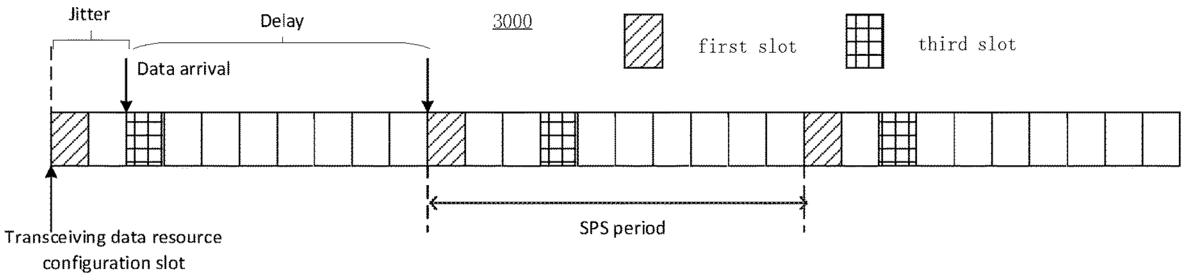
FIG. 3 is a schematic diagram of a jitter delay of a data packet based on an SPS period, shown according to an example.

This part of the scenario not only has the characteristic of periodically generating data streams, but also has the demands of low delay in the data streams. However, the uncertainty of link conditions and business characteristics on a core network side is high, and the transmission of a core network is prone to causing a jitter delay in the time when the data packet arrives at a base station. FIG. 3 is a schematic diagram of a jitter delay 3000 of a data packet based on an SPS period, shown according to an example. As shown in FIG. 3, for example, in a first SPS period, a slot for configuring data transceiving resources is a first slot. Due to the generated jitter delay, the actual arrival of data is in a third slot. The jitter delay is usually in a millisecond level, which makes the transmission of the data packet on the RAN side unable to align with SPS time-domain resources configured by the base station. In response to determining that the data packet is transmitted after waiting for the next SPS time-domain resource, it will cause a significant delay and cannot meet the low delay demands of this part of the scenario (such as the XR scenario). When an arrival period of the data packet changes or is inconsistent with the configured SPS period, the slot resources configured by SPS cannot match the data transceiving demands, and the efficiency of wireless resource scheduling will be greatly reduced.

On the other hand, a recurrent neural network (RNN) in artificial intelligence has shown incredible results in predicting a future value of a given sequence. A long short-term memory network (LSTM) is included in RNN, and LSTM may be used to learn long-term dependency relationships of the sequence and predict the future value of the sequence. Long-term dependence refers to a sequence whose predicted output value depends on a long sequence of an input value, rather than a unique input value.

As a result, based on the above-mentioned problems and the inspiration of a neural network, the disclosure proposes an SPS configuration method, which uses the LSTM to learn an arrival time of a historical data packet and predict an arrival time of the next data packet in the current transmission data packet based on the arrival time of the historical data packet. Due to the strong dynamism of a jitter delay, a single predicted value may not reflect its possible range of variation, making it difficult to accurately guide slot resource allocation. It is also possible to predict a possible interval of a jitter delay for the next packet after a current data packet arrives, and perform resource configuration within the next SPS period based on the delay interval.

The general LSTM may predict a specific time sequence value, that is, it may predict a slot when the data packet arrives within the next SPS period. In response to determining that a jitter delay interval needs to be predicted, a Bayesian LSTM network may be used. The Bayesian LSTM network may set a certain weight, sample the weight through a probability density distribution, and then optimize distribution parameters. Thus, the confidence and uncertainty of the prediction may be measured, and a confidence interval may be obtained as the predicted jitter delay interval.

By means of the disclosure, the jitter delay may be predicted through the LSTM, or the jitter delay interval may be predicted through the Bayesian LSTM network, so as to configure the data transceiving resources in SPS, and thus situations that due to the jitter delay of the core network, transceiving slot resources of the data packets of the radio access network device are not aligned and the data packet transmission delay is increased are avoided. At the same time, based on the periodic characteristics of the data packet, the SPS period is adjusted as needed to dynamically adapt to changes in the arrival period of the data packet.

The disclosure will be illustrated in the following examples in conjunction with the accompanying drawings.

Figure 4:
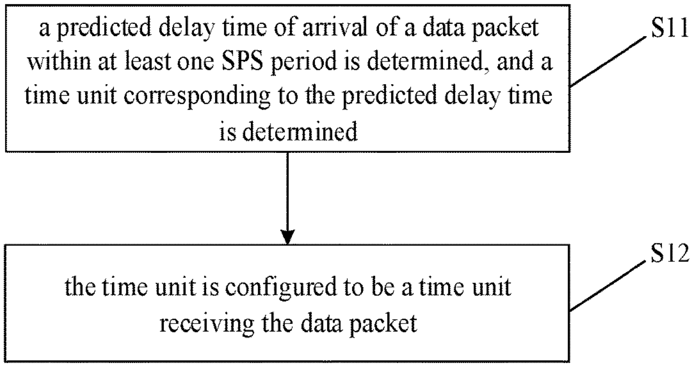
FIG. 4 is a flow diagram of an SPS configuration method shown according to an example.

FIG. 4 is a flow diagram of an SPS configuration method shown according to an example. As shown in FIG. 4, the SPS configuration method is applied in a terminal, and includes the steps S11 and S12.

In step S11, a predicted delay time of arrival of a data packet within at least one SPS period is determined, and a time unit corresponding to the predicted delay time is determined.

In step S12, the time unit is configured to be a time unit receiving the data packet.

In the example of the disclosure, the predicted delay time may be a time point (i.e., moment) or a time period.

When the current data packet arrives, the terminal determines the predicted delay time of arrival of the data packet within at least one subsequent SPS period. According to the determined predicted delay time, a time unit where the time of arrival of the data packet is located, namely, the time unit corresponding to the predicted delay time, is determined. The slot is configured to be a time unit receiving the data packet. The time unit may be a slot, or a sub slot, etc.

In an example of the disclosure, the terminal may determine an arrival time of one data packet following the current data packet, and may also determine arrival times of a plurality of data packets following the current data packet.

By means of the SPS configuration method provided by the example of the disclosure, the arrival time of the data packet within the SPS period may be predicted and determined, the time unit used for receiving the data packet within the SPS period is configured according to determined results, and the terminal receives the data packet within this time unit, thus avoiding the situations that due to the jitter delay of the core network, transceiving slot resources of the data packet of a radio access network device are not aligned and the data packet transmission delay is increased.

In response to determining that the terminal determines a time point of arrival of the data packet, that is, the terminal determines a moment of arrival of at least one data packet following the current data packet. Steps for configuring the time unit used for receiving the data packet according to the arrival moment included in the determined data may refer to FIG. 5. FIG. 5 is a flow diagram of an SPS configuration method shown according to an example. As shown in FIG. 5, the SPS configuration method is applied in a terminal, and includes step S21.

In step S21, in response to determining a predicted delay time point of a data packet within at least one SPS period and in response to determining that a duration from the predicted delay time point to an initial position of the SPS period is greater than or equal to a length of one time unit, it is determined that a time unit following a default data packet receiving time unit is the time unit corresponding to the predicted delay time based on the default data packet receiving time unit of the SPS period.

In some examples of the disclosure, the time point (moment) of arrival of the data packet may be determined. When the current data packet arrives, a predicted delay time point of the data packet within the at least one SPS period is determined, and whether the predicted delay time point exceeds one time unit is determined. In response to determining that the duration from the predicted delay time point to the default data packet receiving time unit of the SPS period is greater than or equal to the length of one time unit, it may be determined that the time unit corresponding to the arrival of the data packet is different from the default data packet receiving time unit of the SPS period, and it is determined that a time unit where the predicted delay time point is located is the time unit corresponding to the predicted delay time by starting from the default data packet receiving time unit of the SPS period.

For example, when the current data packet arrives, the predicted delay time point of the jitter delay of the arrival of the data packet is determined, and a prediction result J is obtained. FIG. 6 is a schematic diagram of slot resource 600 allocation for an SPS configuration method shown according to an example. As shown in FIG. 6, taking an example of a time unit as a slot, it includes a default data packet receiving slot of an SPS period, a slot where a predicted delay time point of arrival of data is located, and a reconfigured resource allocation slot (i.e., a data packet receiving slot). Taking a starting position of a default configuration slot of the SPS period as a starting point, a corresponding slot after a moment J is found, this slot is a slot of arrival of the data packet after the jitter delay, and the slot is configured to be a data receiving slot.

In response to determining that the terminal determines a time period of arrival of the data packet, that is, the terminal determines a predicted delay time period of arrival of at least one data packet following the current data packet. Steps for configuring the time unit for receiving data packets according to the predicted delay time period of data packet arrival, as determined, may refer to FIGS. 7 and 8.

Figure 7:
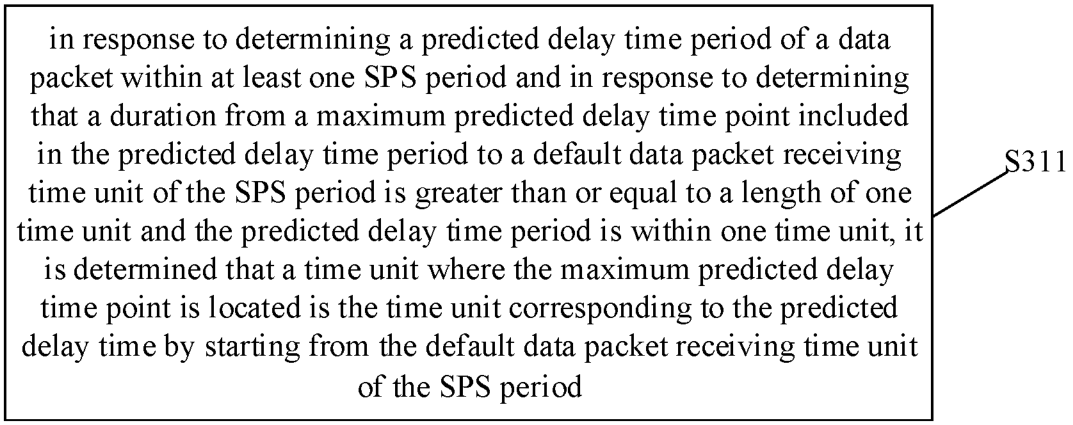
FIG. 7 is a flow diagram of an SPS configuration method shown according to an example.

In an implementation, the predicted delay time period occupies one time unit, and FIG. 7 is a flow diagram of an SPS configuration method shown according to an example. As shown in FIG. 7, the SPS configuration method is applied in a terminal, and includes step S311.

In step S311, in response to determining a predicted delay time period of a data packet within at least one SPS period and in response to determining that a duration from a maximum predicted delay time point included in the predicted delay time period to a default data packet receiving time unit of the SPS period is greater than or equal to a length of one time unit and the predicted delay time period is within one time unit, it is determined that a time unit where the maximum predicted delay time point is located is the time unit corresponding to the predicted delay time by starting from the default data packet receiving time unit of the SPS period.

In the example of the disclosure, when the current data packet arrives, the predicted delay time period of the data packet within the at least one SPS period is determined, and whether the duration from the maximum predicted delay time point included in the predicted delay time period to the default data packet receiving time unit of the SPS period exceeds one time unit is determined. In response to determining that the duration from the maximum predicted delay time point included in the predicted delay time period to the default data packet receiving time unit of the SPS period is greater than or equal to the length of one time unit and the predicted delay time period is within one time unit, it may be determined that the time unit corresponding to the arrival of the data packet is different from the default data packet receiving time unit of the SPS period, and it is determined that a time unit where the maximum predicted delay time point included in the predicted delay time period is located is the time unit corresponding to the predicted delay time by starting from the default data packet receiving time unit of the SPS period.

Figure 8:
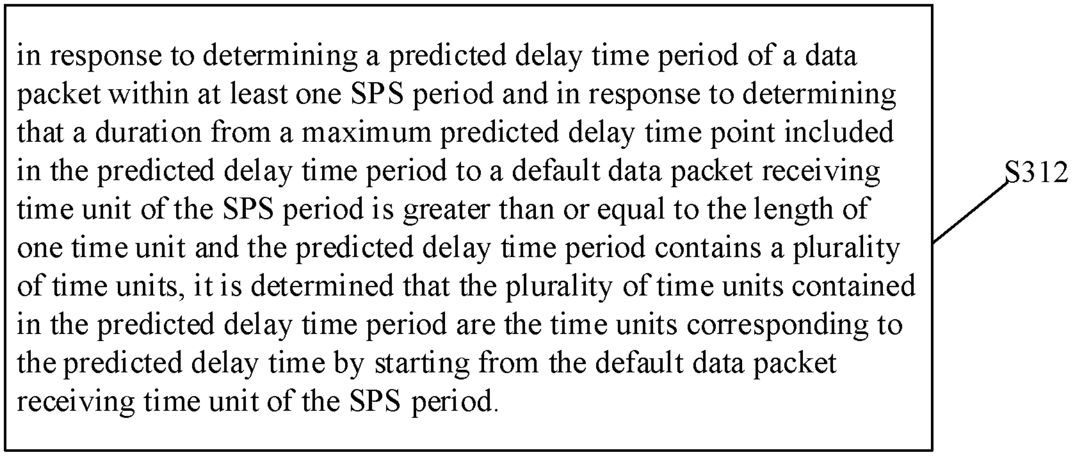
FIG. 8 is a flow diagram of an SPS configuration method shown according to an example.

In another implementation, the predicted delay time period occupies the plurality of time units, and FIG. 8 is a flow diagram of an SPS configuration method shown according to an example. As shown in FIG. 8, the SPS configuration method is applied in a terminal and includes step S312.

In step S312, in response to determining a predicted delay time period of a data packet within at least one SPS period and in response to determining that a duration from a maximum predicted delay time point included in the predicted delay time period to a default data packet receiving time unit of the SPS period is greater than or equal to the length of one time unit and the predicted delay time period contains a plurality of time units, it is determined that the plurality of time units contained in the predicted delay time period are the time units corresponding to the predicted delay time by starting from the default data packet receiving time unit of the SPS period.

In another implementation, when a current data packet arrives, the predicted delay time period of the data packet within the at least one SPS period is determined, and whether the duration from the maximum predicted delay time point included in the predicted delay time period to the default data packet receiving time unit of the SPS period exceeds one time unit is determined. In response to determining that the duration from the maximum predicted delay time point included in the predicted delay time period to the default data packet receiving time unit of the SPS period is greater than or equal to the length of one time unit and the predicted delay time period contains the plurality of time units, it may be determined that the time unit corresponding to the arrival of the data packet is different from the default data packet receiving time unit of the SPS period, and it is determined that the plurality of time units contained in the predicted delay time period are the time units corresponding to the predicted delay time by starting from the default data packet receiving time unit of the SPS period.

Figure 9:
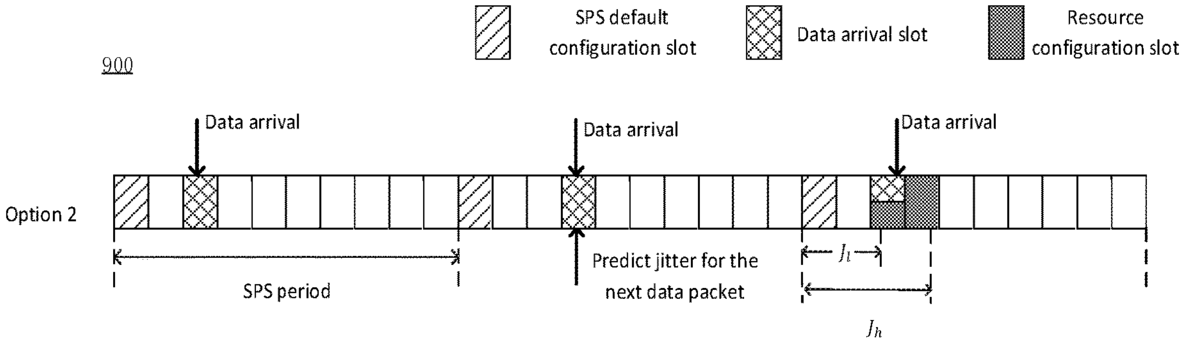
FIG. 9 is a schematic diagram of slot resource allocation for an SPS configuration method shown according to an example.

For example, when the current data packet arrives, the predicted delay time period of the jitter delay of the arrival of the data packet is determined, and a prediction result [$J_l$, $J_h$] is obtained. FIG. 9 is a schematic diagram of slot resource 900 allocation for an SPS configuration method shown according to an example. As shown in FIG. 9, taking an example of a time unit being a slot, it includes a default data packet receiving slot of an SPS period, a slot where a predicted delay time point of arrival of data is located, and a reconfigured resource allocation slot (i.e., a data packet receiving slot). When a current data packet arrives, a jitter delay interval of at least one data packet is determined, and a result [$J_l$, $J_h$] is obtained. Starting from a starting position of a default data packet receiving slot of the next SPS period, a corresponding slot m after a $J_l$ moment and a corresponding slot n after a Jn moment are found, and the slot m, the slot n, and all slots contained between the two are configured to be the data receiving slots.

In some examples of the disclosure, in response to determining that a duration from the predicted delay time point to a default data packet receiving time unit of the SPS period is less than a length of one time unit, or that a duration from a maximum predicted delay time point included in a predicted delay time period to the default data packet receiving time unit of the SPS period is less than the length of one time unit, it is determined that the default data packet receiving time unit of the SPS period is a time unit corresponding to a predicted delay time.

In some examples of the disclosure, the terminal may determine a predicted delay time of the data packet within the SPS period based on a time prediction model, may also receive a first indication message sent by a radio access network device, and determine the predicted delay time of the data packet within the SPS period based on the first indication message. In response to determining that the terminal is configured with the time prediction model, the predicted delay time of the data packet within the SPS period is determined based on the time prediction model. In response to determining that the terminal is not configured with the time prediction model and the radio access network device is configured with the time prediction model, the predicted delay time of the data packet within the SPS period is determined based on the first indication message. That is, the terminal receives the first indication message and parses the first indication message to determine the predicted delay time of the data packet within the SPS period, thus adjusting the time unit of data packet reception.

In some examples of the disclosure, the terminal may receive the first indication message based on downlink control information (DCI) or an MAC control element (MAC CE).

Figure 10:
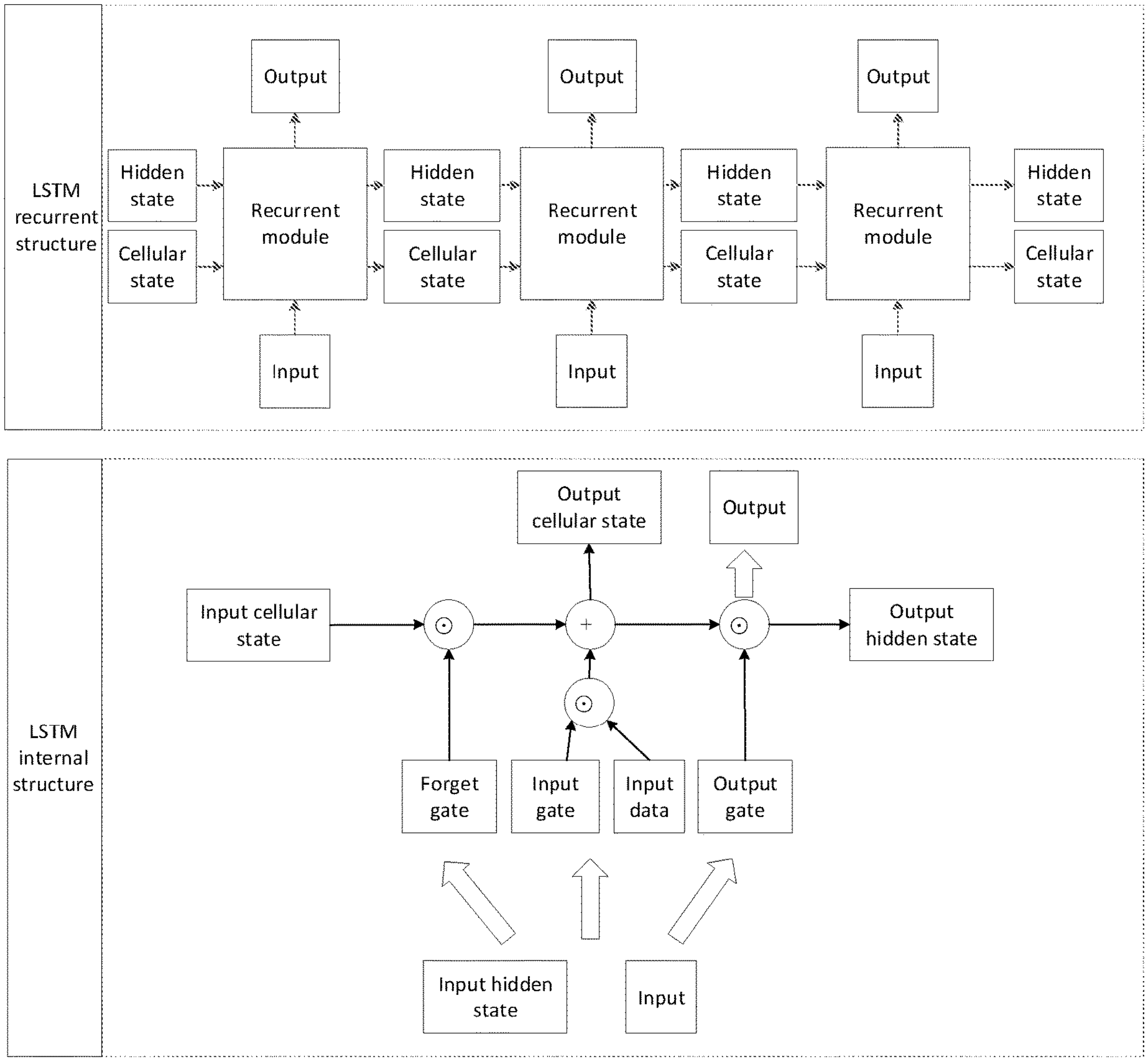
FIG. 10 is a schematic diagram of an LSTM network algorithm for an SPS configuration method, shown according to an example.

The time prediction model may be obtained by training through an actual arrival time of the data packet within a historical SPS period on the basis of an LSTM time recurrent neural network. Most RNNs suffer from a long-term dependency issue, and all RNNs have a chain form of a repetitive neural network module. FIG. 10 is a schematic diagram of an LSTM network algorithm for an SPS configuration method, shown according to an example. As shown in FIG. 10, an LSTM recurrent structure is given to present its chain form. It may be understood that on the one hand, the LSTM contains two delivery states, namely a cellular state and a hidden state, while the RNN merely has a hidden state. On the other hand, the recurrent module structure of the LSTM is relatively complex. More long-term information is retained in the cellular state of the LSTM, while more current input information is retained in the hidden state, which can better solve the long-term dependency issue.

An internal structure of the LSTM included in FIG. 10 shows an internal structure of a recurrent module. Firstly, a current input, a hidden state, and a cellular state outputted by the previous recurrent module are taken as inputs to a current recurrent module. The current input and an input hidden state passed down from the previous state are stitched to obtain four states, which are:

A forget gate: the current input and the input hidden state are stitched, then multiplied by a forgetting weight matrix, and then converted through a sigmoid activation function into values between 0 and 1 to serve as a forget gating state.

An input gate: the current input and the input hidden state are stitched, then multiplied by an input weight matrix, and then converted through a sigmoid activation function into values between 0 and 1 to serve as an input gating state.

Input data: the current input and the input hidden state are stitched, then multiplied by a weight matrix, and then converted through a tanh activation function into values between −1 and 1 to serve as input data.

An output gate: the current input and the input hidden state are stitched, then multiplied by an output weight matrix, and then transformed through a sigmoid activation function into values between 0 and 1 to serve as an output gating state.

The LSTM mainly has three stages: 1. A forgetting stage: the forget gate is used to control which input cell information in the previous state needs to be forgotten and which needs to be remembered. 2. A selective memory stage: processed input data is selectively memorized through the input gate, and outputs obtained from the above two stages are added to obtain an output cellular state transmitted to the next state. 3. An output stage: which information will be considered as the output of the current state is controlled through the output gate.

Based on an LSTM network structure, a Bayesian LSTM algorithm takes weight parameters and biases in the LSTM network as random variables and estimates the parameters through the Bayesian algorithm. A prior distribution is placed on each weight parameter, and how much these weights change in the given data is captured to simulate the uncertainty of model cognition.

Thus, when using the LSTM network for prediction, a length of a historical data sequence used needs to be specified, that is, how many historical moment data are used as inputs for the algorithm needs to be specified. The historical data is input into an LSTM model, the LSTM model uses pre-trained weights, namely, gating, to control forgetting, selective memory, and output of the input data, so as to obtain a predicted output value for the next state (the predicted delay time point). The output predicted value is obtained depending on information in long-term historical data.

Similarly, when using the Bayesian LSTM network for prediction, during each prediction, the network may estimate a value of each weight parameter according to the prior distribution placed, and perform corresponding gating processing on the current input according to the obtained network parameters to obtain the output result. The same input is predicted multiple times, and the weight parameters in each estimation are different, resulting in different output results. By obtaining the plurality of output results corresponding to the same input in this way, a confidence interval, namely a prediction interval (the predicted delay time period) obtained from the prediction of the input data, of the output results is obtained based on a preset confidence level.

Figure 11:
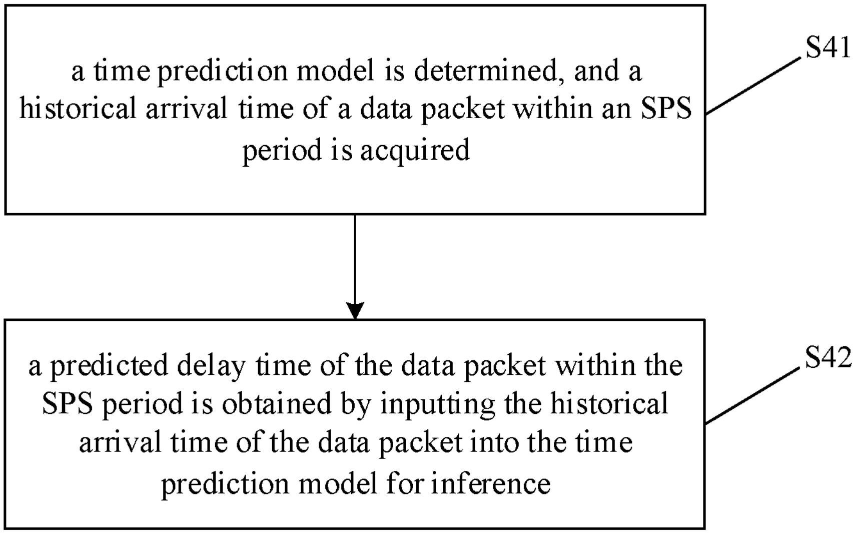
FIG. 11 is a flow diagram of an SPS configuration method shown according to an example.

In response to determining that the terminal is configured with the time prediction model, on the basis of determining the time prediction model, the predicted delay time of the data packet within the SPS period may be determined based on the time prediction model. The steps may refer to FIG. 11. FIG. 11 is a flow diagram of an SPS configuration method shown according to an example. As shown in FIG. 11, the SPS configuration method is applied in a terminal and includes the steps S41 and S42.

In step S41, a time prediction model is determined, and a historical arrival time of a data packet within an SPS period is acquired.

In step S42, a predicted delay time of the data packet within the SPS period is obtained by inputting the historical arrival time of the data packet into the time prediction model for inference.

In the example of the disclosure, the terminal determines the predicted data packet arrival number, acquires a historical actual arrival time data range of the data packet within the SPS period based on the data packet arrival number, and inputs the historical actual arrival time data range of the data packet into the time prediction model to obtain the predicted delay time of the data packet within the SPS period.

After determining the time prediction model, as mentioned herein, a predicted delay time for the arrival of the data packet within one SPS period may be obtained based on the time prediction model, and the predicted delay time for the arrival of the data packets within the plurality of SPS periods may also be obtained. In an implementation of the example of the disclosure, in response to determining the predicted delay time of the data packet within one SPS period, a time unit receiving the data packet within one SPS period is configured based on the time unit. In another implementation of the example of the disclosure, in response to determining the predicted delay time of the data packets within the plurality of SPS periods, the time unit receiving the data packet within each SPS period is configured based on the time unit.

Figure 12:
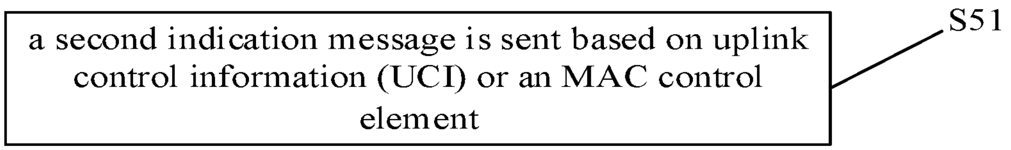
FIG. 12 is a flow diagram of an SPS configuration method shown according to an example.

In some other examples of the disclosure, in response to determining that the terminal is configured and deployed with the time prediction model, but a radio access network device is not configured with the time prediction model, the steps shown in FIG. 12 need to be performed. FIG. 12 is a flow diagram of an SPS configuration method shown according to an example. As shown in FIG. 12, the SPS configuration method is applied in a terminal and includes step S51.

In step S51, a second indication message is sent based on uplink control information (UCI) or an MAC control element.

The second indication message is used to indicate a time unit at which a radio access network device receives a data packet. The time when the radio access network device receives the data packet sent by a core network is the time at which the data packet is sent to the terminal.

In the example of the disclosure, in response to determining that the radio access network device is not configured with the time prediction model, the data packet needs to be sent according to the time unit indicated by the terminal for sending the data packet.

Based on the same/similar concept, an example of the disclosure further provides an SPS configuration method.

Figure 13:
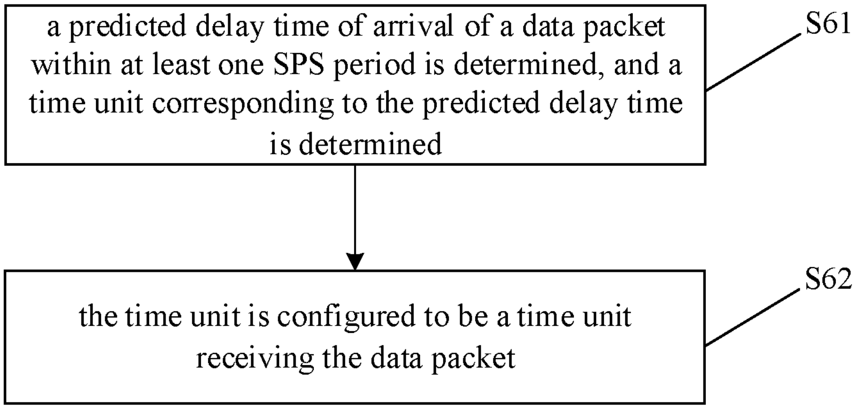
FIG. 13 is a flow diagram of an SPS configuration method shown according to an example.

FIG. 13 is a flow diagram of an SPS configuration method shown according to an example. As shown in FIG. 13, the SPS configuration method is applied in a radio access network device and includes the steps S61 and S62.

In step S61, a predicted delay time of arrival of a data packet within at least one SPS period is determined, and a time unit corresponding to the predicted delay time is determined.

In step S62, the time unit is configured to be a time unit receiving the data packet.

In the example of the disclosure, the predicted delay time may be a time point (i.e., moment) or a time period.

When a current data packet arrives, the radio access network device determines the predicted delay time of arrival of the data packet within the at least one subsequent SPS period. According to the determined predicted delay time, a time unit where the time of arrival of the data packet is located, namely, the time unit corresponding to the predicted delay time, is determined. The slot is configured to be a time unit for sending the data packet. The time unit may be a slot, or a sub slot, etc.

In an example of the disclosure, the radio access network device may determine an arrival time of one data packet following the current data packet, and may also determine arrival times of the plurality of data packets following the current data packet.

By means of the SPS configuration method provided by the example of the disclosure, the arrival time of the data packet within the SPS period may be predicted and determined, the time unit used for receiving the data packet within the SPS period is configured according to determined results, and the radio access network device sends the data packet within this time unit, thus avoiding the situations that due to the jitter delay of a core network, transceiving slot resources of the data packet of the radio access network device are not aligned and the data packet transmission delay is increased.

Figure 14:
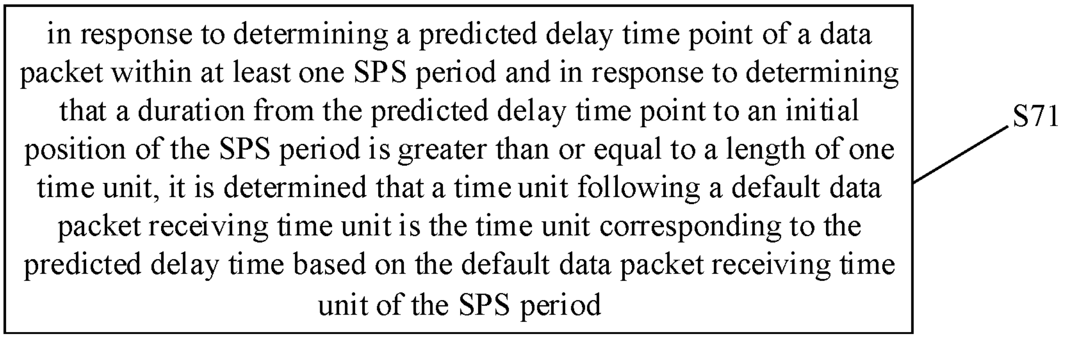
FIG. 14 is a flow diagram of an SPS configuration method shown according to an example.

In response to determining that the radio access network device determines a time point of arrival of the data packet, that is, the radio access network device determines a moment of arrival of at least one data packet following the current data packet. Steps for configuring the time unit used for sending the data packet according to the arrival moment included in the determined data may refer to FIG. 14. FIG. 14 is a flow diagram of an SPS configuration method shown according to an example. As shown in FIG. 14, the SPS configuration method is applied in a radio access network device, and includes step S71.

In step S71, in response to determining a predicted delay time point of a data packet within at least one SPS period and in response to determining that a duration from the predicted delay time point to an initial position of the SPS period is greater than or equal to a length of one time unit, it is determined that a time unit following a default data packet receiving time unit is the time unit corresponding to the predicted delay time based on the default data packet receiving time unit of the SPS period.

In some examples of the disclosure, a time point (moment) of arrival of the data packet may be determined. When the current data packet arrives, the predicted delay time point of the data packet within the at least one SPS period is determined, and whether the predicted delay time point exceeds one time unit is determined. In response to determining that the duration from the predicted delay time point to the default data packet receiving time unit of the SPS period is greater than or equal to the length of one time unit, it may be determined that the time unit corresponding to the arrival of the data packet is different from the default data packet receiving time unit of the SPS period, and it is determined that a time unit where the predicted delay time point is located is the time unit corresponding to the predicted delay time by starting from the default data packet receiving time unit of the SPS period.

For example, when the current data packet arrives, the predicted delay time point of the jitter delay of the arrival of the data packet is determined, and a prediction result J is obtained. FIG. 6 is a schematic diagram of slot resource allocation for an SPS configuration method shown according to an example. As shown in FIG. 6, taking an example of a time unit being a slot, it includes a default data packet receiving slot of an SPS period, a slot where a predicted delay time point of arrival of data is located, and a reconfigured resource allocation slot (i.e., a data packet receiving slot). Taking a starting position of a default configuration slot of the SPS period as a starting point, a corresponding slot after a moment J is found, this slot is a slot of arrival of the data packet after the jitter delay, and the slot is configured to be a data receiving slot.

In response to determining that the radio access network device determines a time period of arrival of the data packet, that is, the radio access network device determines a predicted delay time period of arrival of at least one data packet following the current data packet. Steps for configuring the time unit used for sending the data packet according to the arrival predicted delay time period included in the determined data may refer to FIG. 15 and FIG. 16.

Figure 15:
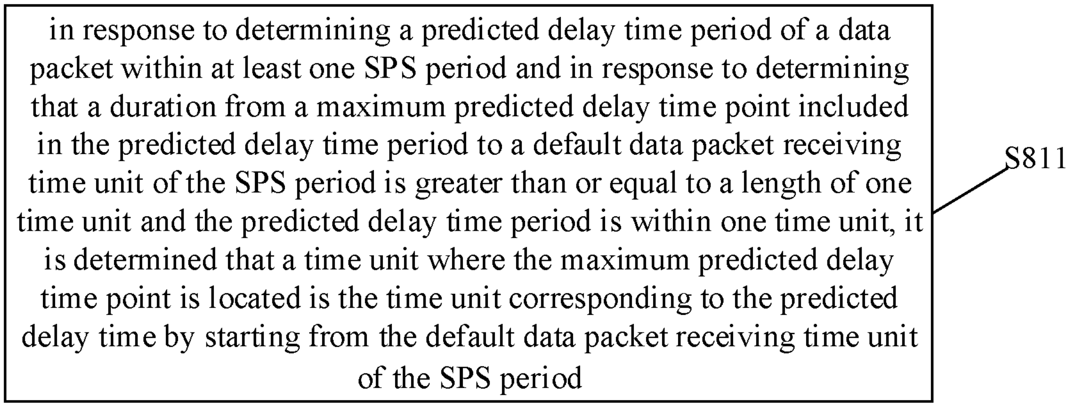
FIG. 15 is a flow diagram of an SPS configuration method shown according to an example.

In an implementation, the predicted delay time period occupies one time unit, and FIG. 15 is a flow diagram of an SPS configuration method shown according to an example. As shown in FIG. 15, the SPS configuration method is applied in a radio access network device, and includes step S811.

In step S811, in response to determining a predicted delay time period of a data packet within at least one SPS period and in response to determining that a duration from a maximum predicted delay time point included in the predicted delay time period to a default data packet receiving time unit of the SPS period is greater than or equal to a length of one time unit and the predicted delay time period is within one time unit, it is determined that a time unit where the maximum predicted delay time point is located is the time unit corresponding to the predicted delay time by starting from the default data packet receiving time unit of the SPS period.

In the example of the disclosure, when a current data packet arrives, the predicted delay time period of the data packet within the at least one SPS period is determined, and whether the duration from the maximum predicted delay time point included in the predicted delay time period to the default data packet receiving time unit of the SPS period exceeds one time unit is determined. In response to determining that the duration from the maximum predicted delay time point included in the predicted delay time period to the default data packet receiving time unit of the SPS period is greater than or equal to the length of one time unit and the predicted delay time period is within one time unit, it may be determined that the time unit corresponding to the arrival of the data packet is different from the default data packet receiving time unit of the SPS period, and it is determined that a time unit where the maximum predicted delay time point included in the predicted delay time period is located is the time unit corresponding to the predicted delay time by starting from the default data packet receiving time unit of the SPS period.

Figure 16:
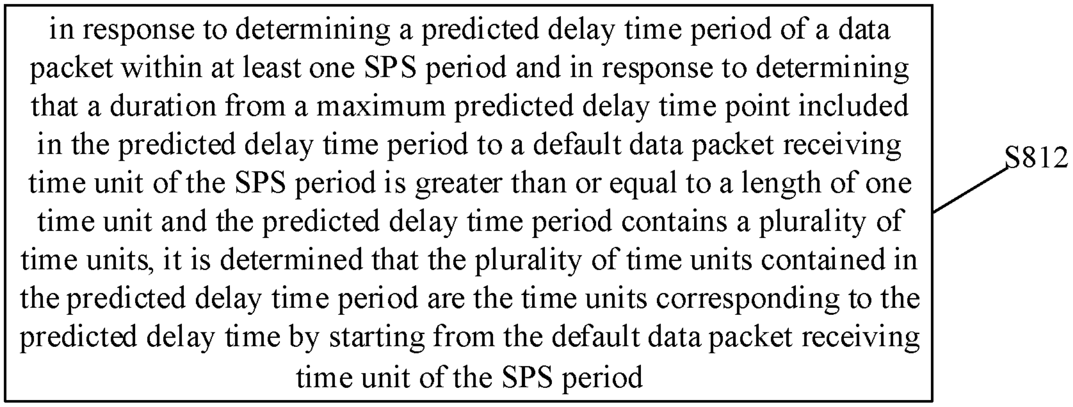
FIG. 16 is a flow diagram of an SPS configuration method shown according to an example.

In another implementation, the predicted delay time period occupies the plurality of time units, and FIG. 16 is a flow diagram of an SPS configuration method shown according to an example. As shown in FIG. 16, the SPS configuration method is applied in a radio access network device and includes step S812.

In step S812, in response to determining a predicted delay time period of a data packet within at least one SPS period and in response to determining that a duration from a maximum predicted delay time point included in the predicted delay time period to a default data packet receiving time unit of the SPS period is greater than or equal to a length of one time unit and the predicted delay time period contains a plurality of time units, it is determined that the plurality of time units contained in the predicted delay time period are the time units corresponding to the predicted delay time by starting from the default data packet receiving time unit of the SPS period.

In another implementation, when a current data packet arrives, the predicted delay time period of the data packet within the at least one SPS period is determined, and whether the duration from the maximum predicted delay time point included in the predicted delay time period to the default data packet receiving time unit of the SPS period exceeds one time unit is determined. In response to determining that the duration from the maximum predicted delay time point included in the predicted delay time period to the default data packet receiving time unit of the SPS period is greater than or equal to the length of one time unit and the predicted delay time period contains the plurality of time units, it may be determined that the time unit corresponding to the arrival of the data packet is different from the default data packet receiving time unit of the SPS period, and it is determined that the plurality of time units contained in the predicted delay time period are the time units corresponding to the predicted delay time by starting from the default data packet receiving time unit of the SPS period.

For example, when the current data packet arrives, the predicted delay time period of the jitter delay of the arrival of the data packet is determined, and a prediction result $[J_l, J_h]$ is obtained. FIG. 9 is a schematic diagram of slot resource allocation for an SPS configuration method shown according to an example. As shown in FIG. 9, taking an example of a time unit being a slot, it includes a default data packet receiving slot of an SPS period, a slot where a predicted delay time point of arrival of data is located, and a reconfigured resource allocation slot (i.e., a data packet receiving slot). When a current data packet arrives, a jitter delay interval of at least one data packet is determined, and a result $[J_l, J_h]$ is obtained. Starting from a starting position of a default data packet receiving slot of the next SPS period, a corresponding slot m after a $J_l$ moment and a corresponding slot n after a $J_h$ moment are found, and the slot m, the slot n, and all slots contained between the two are configured to be the data receiving slots.

In some examples of the disclosure, in response to determining that a duration from the predicted delay time point to a default data packet receiving time unit of the SPS period is less than a length of one time unit, or that a duration from a maximum predicted delay time point included in a predicted delay time period to the default data packet receiving time unit of the SPS period is less than the length of one time unit, it is determined that the default data packet receiving time unit of the SPS period is a time unit corresponding to a predicted delay time.

In some examples of the disclosure, the radio access network device may determine a predicted delay time of the data packet within the SPS period based on a time prediction model, may also receive a second indication message sent by a terminal, and determine the predicted delay time of the data packet within the SPS period based on the second indication message. In response to determining that the radio access network device is configured with the time prediction model, the predicted delay time of the data packet within the SPS period is determined based on the time prediction model. In response to determining that the radio access network device is not configured with the time prediction model and the terminal is configured with the time prediction model, the predicted delay time of the data packet within the SPS period is determined based on the second indication message. That is, the terminal receives the second indication message and parses the second indication message to determine the predicted delay time of the data packet within the SPS period, thus adjusting the time unit of data packet reception.

In some examples of the disclosure, the radio access network device may receive the second indication message based on UCI or an MAC CE.

The time prediction model may be obtained by training through an actual arrival time of the data packet within a historical SPS period on the basis of an LSTM time recurrent neural network. Most RNNs suffer from a long-term dependency issue, and all RNNs have a chain form of a repetitive neural network module. FIG. 10 is a schematic diagram of an LSTM network algorithm for an SPS configuration method, shown according to an example. As shown in FIG. 10, an LSTM recurrent structure is given to present its chain form. It may be understood that on the one hand, the LSTM contains two delivery states, namely a cellular state and a hidden state, while the RNN merely has a hidden state. On the other hand, the recurrent module structure of the LSTM is relatively complex. More long-term information is retained in the cellular state of the LSTM, while more current input information is retained in the hidden state, which can better solve the long-term dependency issue.

An internal structure of the LSTM included in FIG. 10 shows an internal structure of a recurrent module. Firstly, a current input, a hidden state, and a cellular state outputted by the previous recurrent module are taken as inputs to a current recurrent module. The current input and an input hidden state passed down from the previous state are stitched to obtain four states, which are:

A forget gate: the current input and the input hidden state are stitched, then multiplied by a forgetting weight matrix, and then converted through a sigmoid activation function into values between 0 and 1 to serve as a forget gating state.

An input gate: the current input and the input hidden state are stitched, then multiplied by an input weight matrix, and then converted through a sigmoid activation function into values between 0 and 1 to serve as an input gating state.

Input data: the current input and the input hidden state are stitched, then multiplied by a weight matrix, and then converted through a tanh activation function into values between-1 and 1 to serve as input data.

An output gate: the current input and the input hidden state are stitched, then multiplied by an output weight matrix, and then transformed through a sigmoid activation function into values between 0 and 1 to serve as an output gating state.

The LSTM mainly has three stages: 1. A forgetting stage: the forget gate is used to control which input cell information in the previous state needs to be forgotten and which needs to be remembered. 2. A selective memory stage: processed input data is selectively memorized through the input gate, and outputs obtained from the above two stages are added to obtain an output cellular state transmitted to the next state. 3. An output stage: which information will be considered as the output of the current state is controlled through the output gate.

Based on an LSTM network structure, a Bayesian LSTM algorithm takes weight parameters and biases in the LSTM network as random variables and estimates the parameters through the Bayesian algorithm. A prior distribution is placed on each weight parameter, and how much these weights change in the given data is captured to simulate the uncertainty of model cognition.

Thus, when using the LSTM network for prediction, a length of a historical data sequence used needs to be specified, that is, how many historical moment data are used as inputs for the algorithm needs to be specified. The historical data is input into an LSTM model, the LSTM model uses pre-trained weights, namely, gating, to control forgetting, selective memory, and output of the input data, so as to obtain a predicted output value for the next state (the predicted delay time point). The output predicted value is obtained depending on information in long-term historical data.

Similarly, when using the Bayesian LSTM network for prediction, during each prediction, the network may estimate a value of each weight parameter according to the prior distribution placed, and perform corresponding gating processing on the current input according to the obtained network parameters to obtain the output result. The same input is predicted multiple times, and weight parameters in each estimation are different, resulting in different output results. By obtaining the plurality of output results corresponding to the same input in this way, a confidence interval, namely a prediction interval (the predicted delay time period) obtained from the prediction of the input data, of the output results is obtained based on a preset confidence level.

Figure 17:
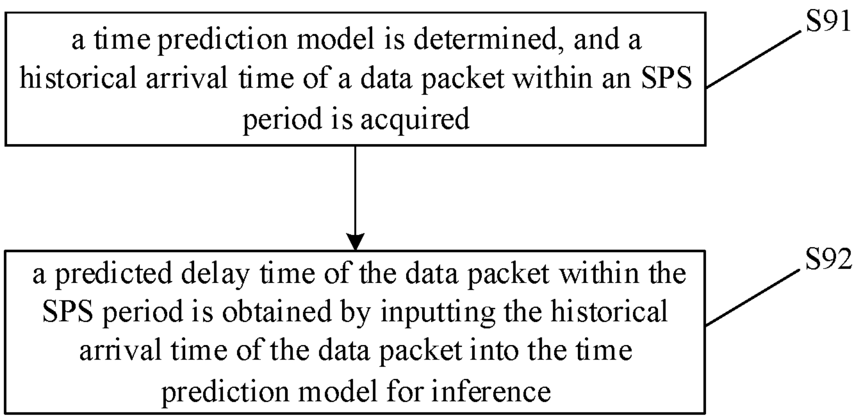
FIG. 17 is a flow diagram of an SPS configuration method shown according to an example.

In response to determining that the terminal is configured with the time prediction model, on the basis of determining the time prediction model, the predicted delay time of the data packet within the SPS period may be determined based on the time prediction model. The steps may refer to FIG. 17. FIG. 17 is a flow diagram of an SPS configuration method shown according to an example. As shown in FIG. 17, the SPS configuration method is applied in a radio access network device and includes the steps S91 and S92.

In step S91, a time prediction model is determined, and a historical arrival time of a data packet within an SPS period is acquired.

In step S92, a predicted delay time of the data packet within the SPS period is obtained by inputting the historical arrival time of the data packet into the time prediction model for inference.

In the example of the disclosure, the radio access network device determines the predicted data packet arrival number, acquires a historical actual arrival time data range of the data packet within the SPS period based on the data packet arrival number, and inputs the historical actual arrival time data range of the data packet into the time prediction model to obtain the predicted delay time of data packet within the SPS period.

After determining the time prediction model, as mentioned herein, a predicted delay time for the arrival of the data packet within one SPS period may be obtained based on the time prediction model, and the predicted delay time for the arrival of the data packets within the plurality of SPS periods may also be obtained. In an implementation of the example of the disclosure, in response to determining the predicted delay time of the data packet within one SPS period, a time unit for sending the data packet within one SPS period is configured based on the time unit. In another implementation of the example of the disclosure, in response to determining the predicted delay time of the data packets within the plurality of SPS periods, the time unit sending the data packet within each SPS period is configured based on the time unit.

Figure 18:
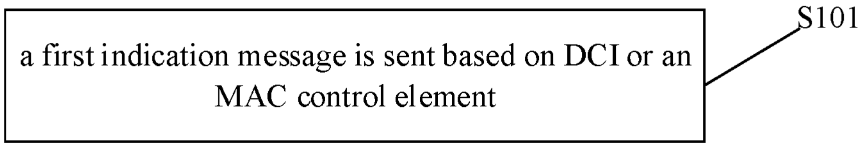
FIG. 18 is a flow diagram of an SPS configuration method shown according to an example.

In some other examples of the disclosure, in response to determining that the radio access network device is configured and deployed with the time prediction model, but a terminal is not configured with the time prediction model, the steps shown in FIG. 18 need to be performed. FIG. 18 is a flow diagram of an SPS configuration method shown according to an example. As shown in FIG. 18, the SPS configuration method is applied in a radio access network device and includes step S101.

In step S101, a first indication message is sent based on DCI or an MAC control element.

The first indication message is used to indicate a time unit at which a terminal receives a data packet.

In the example of the disclosure, in response to determining that the terminal is not configured with the time prediction model, the data packet needs to be sent according to the time unit indicated by the terminal for sending the data packet.

In some examples of the disclosure, in response to determining that the terminal is configured with the time prediction model, and the radio access network device is also configured with the same time prediction model.

One way is that the terminal and the radio access network device may respectively adopt a single-step prediction method, that is, be based on the time prediction model, to predict a predicted delay time of arrival of the data packet within one SPS period. When one data packet arrives, the terminal predicts the predicted delay time of arrival of the next data packet based on a local historical data packet arrival jitter delay sequence. The radio access network device configures a data sending time unit within the next SPS period according to a prediction result, and UE configures a data receiving time unit within the next SPS period according to an obtained result.

Another way is that the terminal and the radio access network device may respectively adopt a multi-step prediction method, that is, be based on the time prediction model, to predict a predicted delay time of arrival of the data packets within the plurality of SPS periods. Firstly, the number M of the SPS periods is determined. When an Mth data packet predicted previously arrives, the terminal and the radio access network device respectively predict the predicted delay time of the arrival of the next M data packets based on the local historical data packet arrival jitter delay sequence. The radio access network device configures a data sending time unit within the M SPS periods according to a prediction result, and the terminal configures a data receiving time unit within the M SPS periods according to the prediction result.

In the example of the disclosure, the terminal and the radio access network device may further adjust a configured SPS period in response to a period of the predicted delay time being different from the configured SPS period. In other words, the terminal and the radio access network device may further observe historical data packet arrival time sequence information. In response to determining that periodic changes of the arrival periods of the data packet are observed, the SPS periods are adjusted respectively to adapt to a new data packet arrival period.

Figure 19:
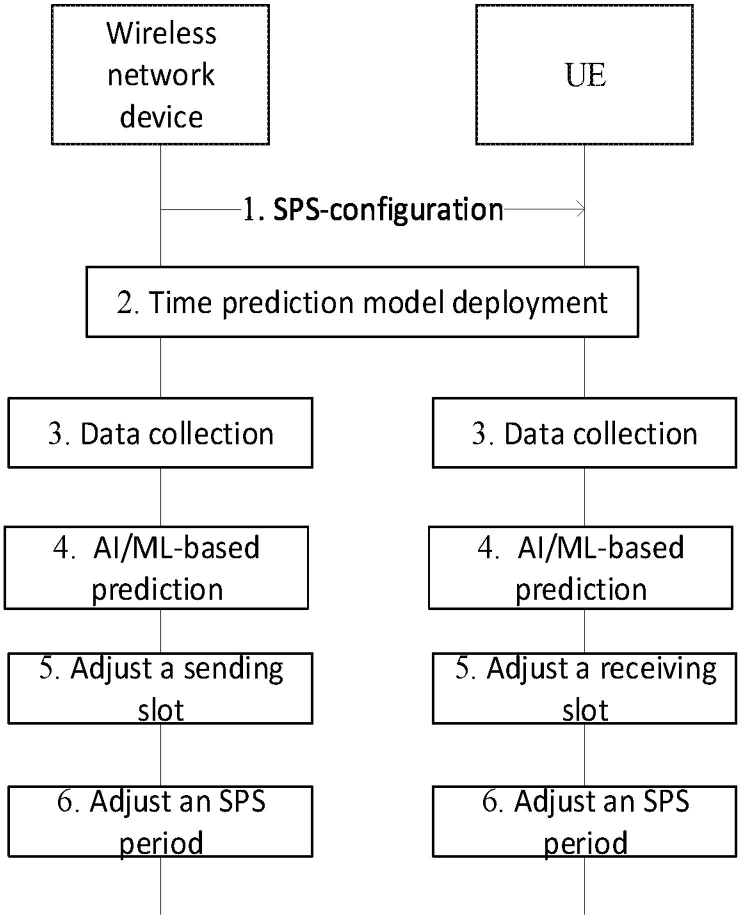
FIG. 19 is a schematic diagram of a protocol and interface of a configuration process corresponding to a deployment of a time prediction model in a terminal and a radio access network device in an SPS configuration method shown according to an example.

In response to determining that both the terminal and the radio access network device are configured and deployed with the time prediction model, please refer to FIG. 19. FIG. 19 is a schematic diagram of a protocol and interface of a configuration process corresponding to a deployment of a time prediction model in a terminal and a radio access network device in an SPS configuration method shown according to an example. FIG. 19 includes:

1. The radio access network device (such as gNB) performs SPS configuration on the terminal (such as UE) to specify wireless resources used by the UE.
2. The gNB selects an appropriate time prediction model and sends the time prediction model to the UE so as to deploy the same time prediction model on both gNB and UE sides.
3. The gNB and the UE, respectively, collect local historical data packet arrival jitter delay data.
4. The gNB and the UE, respectively, use the collected data for AI/ML (time prediction model) model inference to obtain prediction results.
5. The gNB/UE adjusts slot resources for sending/receiving the data packet according to the prediction results. In response to determining that a configuration solution based on a single-step prediction result is adopted, the slot resources within the next SPS period are adjusted; and in response to determining that a configuration solution based on a multi-step prediction result is adopted, the slot resources within M SPS periods are adjusted.
6. The gNB and the UE, respectively, observe periodic characteristics of an arrival time of a historical data packet. If it is found that the arrival period of the data packet changes, the SPS period is adjusted to adapt to the changing arrival period of the data packet. It needs to be noted that whether this step is executed may be selected according to the actual situation.

In some other examples of the disclosure, in response to determining that the terminal is not configured with the time prediction model, the radio access network device is configured with the time prediction model.

One way is that the radio access network device may adopt a single-step prediction method, that is, be based on the time prediction model, to predict a delay time of arrival of the data packet within one SPS period. When one data packet arrives, the radio access network device predicts the predicted delay time of arrival of the next data packet based on a local historical data packet arrival jitter delay sequence. The radio access network device configures a data sending time unit within the next SPS period according to the prediction result, and indicates the terminal to configure a time unit for data packet reception through DCI/MAC CE (first indication message), and the terminal configures a data receiving time unit within the next SPS period according to the received indication message.

Another way is that the radio access network device may adopt a multi-step prediction method, that is, be based on the time prediction model, to predict the predicted delay time of arrival of the data packets within the plurality of SPS periods. Firstly, the number M of the SPS periods is determined. When an Mth data packet predicted previously arrives, the radio access network device predicts the predicted delay time of the arrival of the next M data packets based on the local historical data packet arrival jitter delay sequence. The radio access network device configures a data sending time unit within the M SPS periods according to the prediction result, and indicates the terminal to configure the time unit for data packet reception through DCI/MAC CE (a first indication message), and the terminal configures the data receiving time unit within the M SPS periods according to the indication message.

Figure 20:
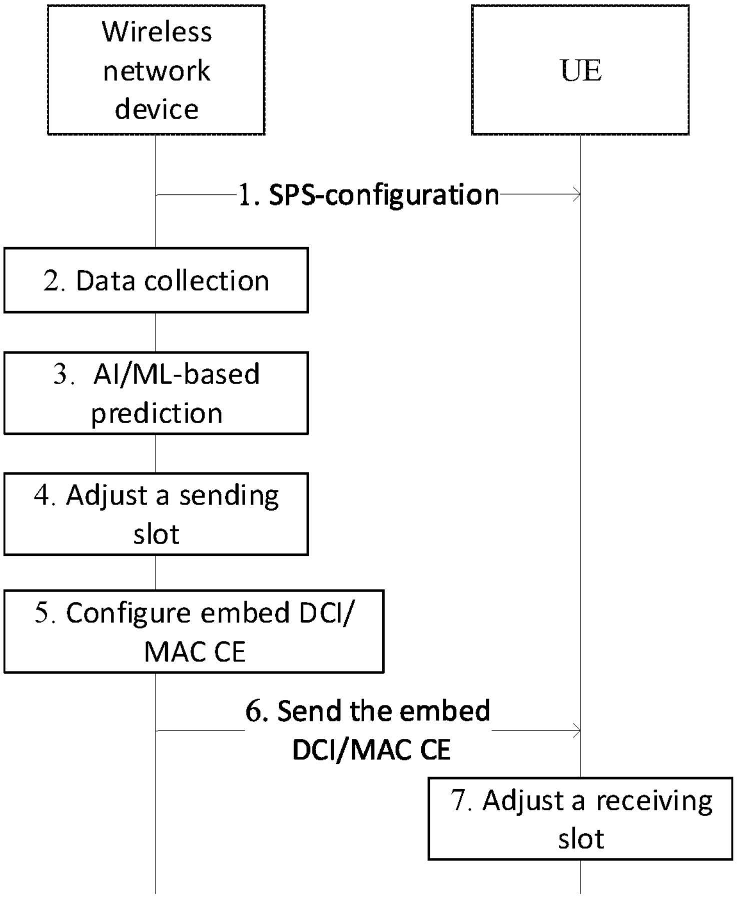
FIG. 20 is a schematic diagram of a protocol and interface of a configuration process corresponding to a deployment of a time prediction model in a radio access network device in an SPS configuration method shown according to an example.

In response to determining that the terminal is configured with the time prediction model and the radio access network device is not configured with the time prediction model, please refer to FIG. 20. FIG. 20 is a schematic diagram of a protocol and interface of a configuration process corresponding to a deployment of a time prediction model in a radio access network device in an SPS configuration method shown according to an example. FIG. 20 includes:

1. The radio access network device (such as gNB) performs SPS configuration on UE to specify wireless resources used by the UE.
2. The gNB selects an appropriate time prediction model and collects local historical data packet arrival jitter delay data.
3. The gNB uses the collected data for AI/ML model (time prediction model) inference to obtain prediction results.
4. The gNB adjusts slot resources for sending the data packet according to the prediction results. In response to determining that a configuration solution based on a single-step prediction result is adopted, the slot resources within the next SPS period are adjusted; and in response to determining that a configuration solution based on a multi-step prediction result is adopted, the slot resources within M SPS periods are adjusted.
5. The gNB configures embedded DCI/MAC CE to indicate a resource allocation method.
6. The gNB sends the embedded DCI/MAC CE to the UE.
7. After parsing the embedded DCI/MAC CE, the UE adjusts the slot resources for receiving the data packet according to the parsing information. In response to determining that a configuration solution based on a single-step prediction result is adopted, the slot resources within the next SPS period are adjusted; and in response to determining that a configuration solution based on a multi-step prediction result is adopted, the slot resources within M SPS periods are adjusted.

In some other examples of the disclosure, in response to determining that the terminal is configured with the time prediction model, and the radio access network device is not configured with the time prediction model.

One way is that the terminal may adopt a single-step prediction method, that is, be based on the time prediction model, to predict a delay time of arrival of the data packet within one SPS period. When one data packet arrives, the terminal predicts the predicted delay time of arrival of the next data packet based on a local historical data packet arrival jitter delay sequence. The terminal configures a data sending time unit within the next SPS period according to the prediction result, and indicates the radio access network device to configure a time unit for data packet sending through UCI/MAC CE (a first indication message), and the radio access network device configures a data receiving time unit within the next SPS period according to the sent indication message.

Another way is that the terminal may adopt a multi-step prediction method, that is, be based on the time prediction model, to predict a predicted delay time of arrival of the data packets within the plurality of SPS periods. Firstly, the number M of the SPS periods is determined. When an Mth data packet predicted previously arrives, the terminal predicts the predicted delay time of the arrival of the next M data packets based on the local historical data packet arrival jitter delay sequence. The terminal configures a data sending time unit within the M SPS periods according to the prediction results, and indicates the radio access network device to configure a time unit for data packet sending through UCI/MAC CE (a first indication message), and the radio access network device configures a data sending time unit within the M SPS periods according to the indication message.

Figure 21:
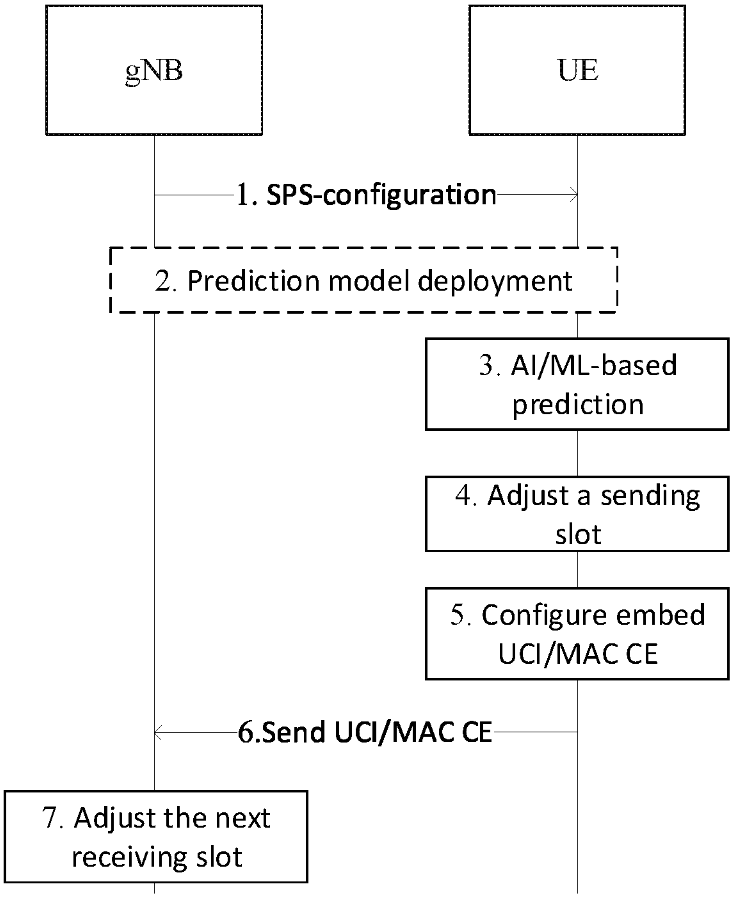
FIG. 21 is a schematic diagram of a protocol and interface of a configuration process corresponding to a deployment of a time prediction model in a terminal in an SPS configuration method shown according to an example.

In response to determining that the terminal is configured with the time prediction model and the radio access network device is not configured with the time prediction model, please refer to FIG. 21. FIG. 21 is a schematic diagram of a protocol and interface of a configuration process corresponding to a deployment of a time prediction model in a terminal in an SPS configuration method shown according to an example. FIG. 21 includes:

1. The radio access network device (such as gNB) performs SPS configuration on UE to specify wireless resources used by the UE.
2. The gNB selects an appropriate time prediction model and sends the time prediction model to the UE so as to deploy the time prediction model on a UE side. This step may be selectively executed according to the actual situation. In response to determining that this step is not executed, the UE uses a locally trained model to complete the prediction.
3. The UE collects local historical data packet arrival jitter delay data.
4. The UE uses the collected data for AI/ML model (time prediction model) inference to obtain prediction results.
5. The UE adjusts slot resources for sending the data packet according to the prediction results. In response to determining that a configuration solution based on a single-step prediction result is adopted, the slot resources within the next SPS period are adjusted; and in response to determining that a configuration solution based on a multi-step prediction result is adopted, the slot resources within M SPS periods are adjusted.
6. The UE configures UCI/MAC CE to indicate a resource allocation method.
7. The UE sends the UCI/MAC CE to the UE.
8. After parsing the UCI/MAC CE, the gNB adjusts the slot resources for receiving the data packet according to the parsing information. In response to determining that a configuration solution based on a single-step prediction result is adopted, the slot resources within the next SPS period are adjusted; and in response to determining that a configuration solution based on a multi-step prediction result is adopted, the slot resources within M SPS periods are adjusted.

Figure 22:
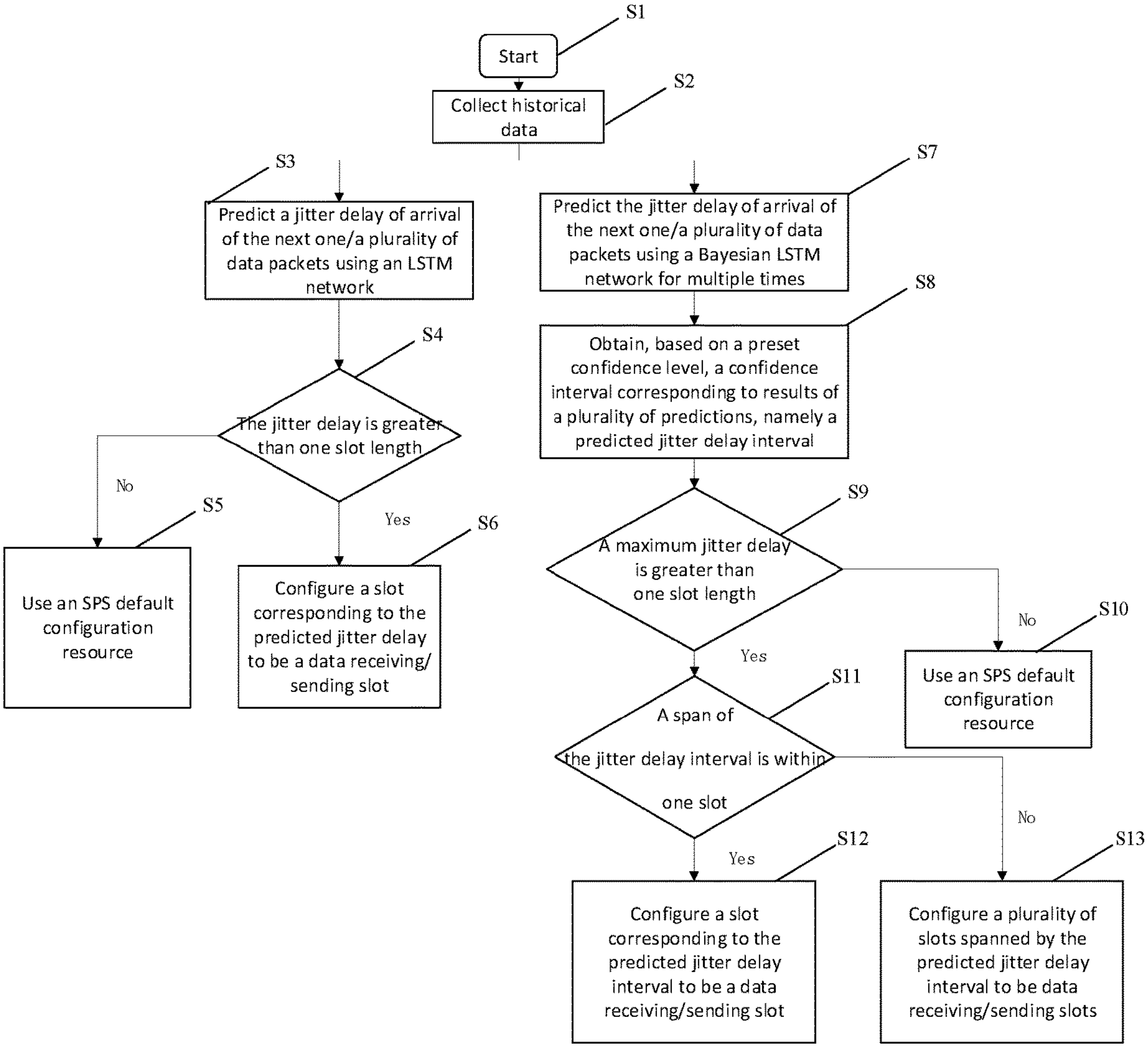
FIG. 22 is a flow diagram of a neural network-based SPS resource allocation algorithm of an SPS configuration method shown according to an example.

In some examples of the disclosure, the implementations of configuring the time prediction model for both the terminal and/or the radio access network device may refer to FIG. 22. FIG. 22 is a flow diagram of a neural network-based SPS resource allocation algorithm of an SPS configuration method shown according to an example. As shown in FIG. 22, the algorithm may be executed on the terminal and/or the radio access network device. The algorithm considers a process of resource allocation based on the prediction results. If it needs to perform corresponding resource allocation after signaling indication based on the prediction results, the process and thought are the same. The algorithm is as follows:

Step 1: an SPS resource allocation algorithm based on Bayesian LSTM is started to be executed. Step 2: historical data packet arrival jitter delay data is collected. In response to determining that an LSTM network is used to predict a jitter delay of arrival of a data packet, the following steps are executed. Step 3: the jitter delay of arrival of the next one/a plurality of data packets is predicted using the LSTM network based on collected historical data. Step 4: whether the predicted jitter delay is greater than one slot length is judged. In response to determining that the predicted jitter delay is greater than one slot length, it indicates that an SPS default configuration slot cannot meet the data transmission demands (step 6). Thus, a slot corresponding to the predicted jitter delay is configured to be a data receiving/sending slot. In response to determining that the predicted jitter delay is less than one slot length, it indicates that the SPS default configuration slot can meet the data transmission demands (step 5). There is no need to reconfigure resources, and the SPS default configuration slot may be used.

In response to determining that the Bayesian LSTM is used to predict a jitter delay interval of arrival of the data packet, the following steps are executed. Step 7: a Bayesian LSTM network is used to predict the jitter delay of the next one/a plurality of data packets based on collected historical data multiple times, and obtain a plurality of prediction results. Based on a preset confidence level, a confidence interval corresponding to the plurality of prediction results, namely the predicted jitter delay interval, is obtained (step 8). Whether the predicted maximum jitter delay (i.e., an upper bound of the jitter delay interval) is greater than one slot length is judged (step 9). In response to determining that the predicted maximum jitter delay is greater than one slot length, it indicates that the SPS default configuration slot cannot meet the data transmission demands. Whether a span of the jitter delay interval is within one slot is judged (step 11). In response to determining that the predicted maximum jitter delay is less than one slot length, it indicates that the SPS default configuration slot can meet the data transmission demands (step 10). There is no need to reconfigure resources, and the SPS default configuration slot may be used. In response to determining that a predicted jitter delay span is within one slot, it indicates that the uncertainty of jitter delay is relatively low (step 12). Thus, configuring one corresponding slot to be a data receiving/sending slot can meet the data transmission demands. In response to determining that the predicted jitter delay spans the plurality of slots, it indicates that the uncertainty of jitter delay is relatively high (step 13). Thus, the plurality of slots that the jitter delay will span are configured as data receiving/sending slots to ensure that the data can be sent/received timely with more slot resources.

Based on the same concept, an example of the disclosure further provides an SPS configuration apparatus.

It may be understood that, in order to implement the included functions, the SPS configuration apparatus provided by the example of the disclosure contains corresponding hardware structures and/or software modules for executing all the functions. Combining with units and algorithm steps of each example disclosed in the example of the disclosure, the example of the disclosure can be implemented in the form of hardware or a combination of hardware and computer software. Whether a certain function is executed in a hardware mode or a mode of the hardware driven by the computer software depends on a specific application and design constraint conditions of the technical solution. Those skilled in the art may use different methods to implement the described functions for each specific application, but such implementation is not to be regarded beyond the scope of the technical solution of the example of the disclosure.

Figure 23:
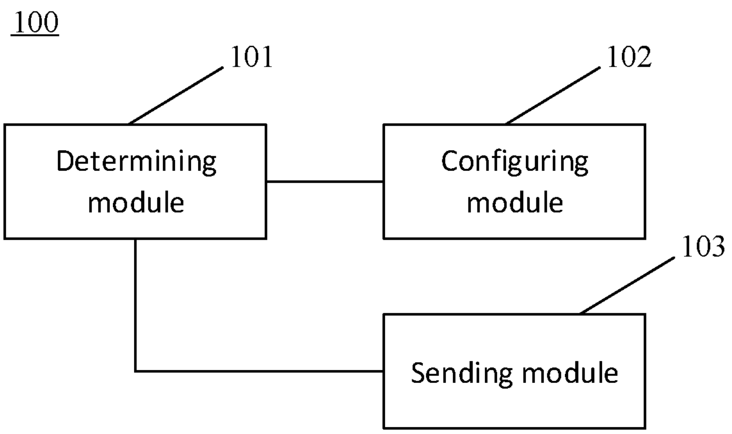
FIG. 23 is a block diagram of an SPS configuration apparatus shown according to an example.

FIG. 23 is a block diagram of an SPS configuration apparatus shown according to an example. Referring to FIG. 23, the SPS configuration apparatus 100 is applied to a terminal, and includes a determining module 101, a configuring module 102, and a sending module 103.

The determining module 101 is configured to determine a predicted delay time of arrival of a data packet within at least one SPS period, and determine a time unit corresponding to the predicted delay time. The configuring module 102 is configured to configure the time unit to be a time unit receiving the data packet.

In the example of the disclosure, the predicted delay time is a predicted delay time point.

The determining module 101 is configured to determine, in response to determining a predicted delay time point of the data packet within the at least one SPS period and in response to determining that a duration from the predicted delay time point to a default data packet receiving time unit of the SPS period is greater than or equal to a length of one time unit, that a time unit where the predicted delay time point is located is the time unit corresponding to the predicted delay time by starting from the default data packet receiving time unit of the SPS period.

In the example of the disclosure, the predicted delay time is a predicted delay time period.

The determining module 101 is configured to determine, in response to determining a predicted delay time period of the data packet within the at least one SPS period and in response to determining that a duration from a maximum predicted delay time point included in the predicted delay time period to a default data packet receiving time unit of the SPS period is greater than or equal to a length of one time unit and the predicted delay time period is within one time unit, that a time unit where the maximum predicted delay time point is located is the time unit corresponding to the predicted delay time by starting from the default data packet receiving time unit of the SPS period; or, determine, in response to determining the predicted delay time period of the data packet within the at least one SPS period and in response to determining that the duration from the maximum predicted delay time point included in the predicted delay time period to the default data packet receiving time unit of the SPS period is greater than or equal to the length of one time unit and the predicted delay time period contains a plurality of time units, that the plurality of time units contained in the predicted delay time period are the time units corresponding to the predicted delay time based on the default data packet receiving time unit of the SPS period.

In the example of the disclosure, the determining module 101 is configured to determine, in response to determining that the duration from the predicted delay time point to the default data packet receiving time unit of the SPS period is less than the length of one time unit, or that the duration from the maximum predicted delay time point included in the predicted delay time period to the default data packet receiving time unit of the SPS period is less than the length of one time unit, that the default data packet receiving time unit of the SPS period is the time unit corresponding to the predicted delay time.

In the example of the disclosure, the determining module 101 is configured to determine the predicted delay time of the data packet within the SPS period based on a time prediction model, or determine the predicted delay time of the data packet within the SPS period based on a received first indication message.

In the example of the disclosure, the determining module 101 is configured to determine the time prediction model and acquire a historical arrival time of the data packet within the SPS period; and obtain the predicted delay time of the data packet within the SPS period by inputting the historical arrival time of the data packet into the time prediction model for inference.

In the example of the disclosure, the first indication message is received based on downlink control information (DCI) or an MAC control element (CE).

In the example of the disclosure, the configuring module 102 is configured to configure, in response to determining the predicted delay time of the data packet within one SPS period, the time unit receiving the data packet within one SPS period based on the time unit; or configure, in response to determining the predicted delay time of the data packets within the plurality of SPS periods, the time unit receiving the data packet within each SPS period based on the time unit respectively.

In the example of the disclosure, the configuring module 102 is further configured to adjust a configured SPS period in response to that a period of the predicted delay time being different from the configured SPS period.

The sending module 103 is configured to send a second indication message based on uplink control information (UCI) or an MAC control element, the second indication message being used for indicating a time unit at which a radio access network device receives the data packet.

Figure 24:
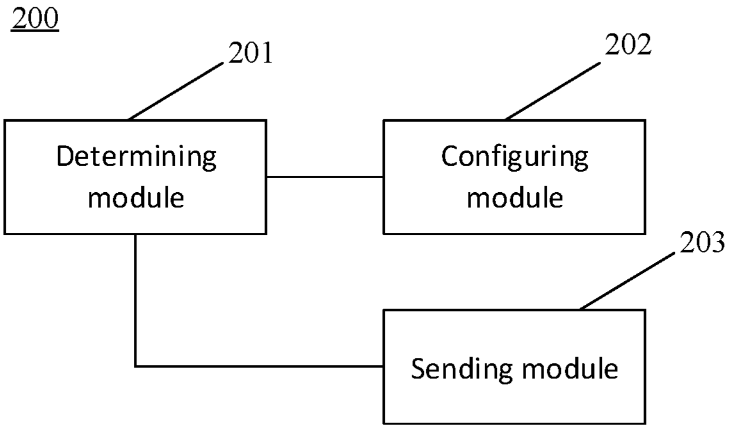
FIG. 24 is a block diagram of an SPS configuration apparatus shown according to an example.

FIG. 24 is a block diagram of an SPS configuration apparatus shown according to an example. Referring to FIG. 24, the SPS configuration apparatus 200 is applied to a radio access network device, and includes a determining module 201, a configuring module 202, and a sending module 203.

The determining module 201 is configured to determine a predicted delay time of a data packet within at least one SPS period, and determine a time unit corresponding to the predicted delay time. The configuring module 202 is configured to configure the time unit to be a time unit sending the data packet.

In the example of the disclosure, the predicted delay time is a predicted delay time point.

The determining module 201 is configured to determine, in response to determining a predicted delay time point of the data packet within the at least one SPS period and in response to determining that a duration from the predicted delay time point to a default data packet receiving time unit of the SPS period is greater than or equal to a length of one time unit, that a time unit where the predicted delay time point is located is the time unit corresponding to the predicted delay time by starting from the default data packet receiving time unit of the SPS period.

In the example of the disclosure, the predicted delay time is a predicted delay time period.

The determining module 201 is configured to determine, in response to determining a predicted delay time period of the data packet within the at least one SPS period and in response to determining that a duration from a maximum predicted delay time point included in the predicted delay time period to a default data packet receiving time unit of the SPS period is greater than or equal to a length of one time unit and the predicted delay time period is within one time unit, that a time unit where the maximum predicted delay time point is located is the time unit corresponding to the predicted delay time by starting from the default data packet receiving time unit of the SPS period; or, determine, in response to determining the predicted delay time period of the data packet within the at least one SPS period and in response to determining that the duration from the maximum predicted delay time point included in the predicted delay time period to the default data packet receiving time unit of the SPS period is greater than or equal to the length of one time unit and the predicted delay time period is not within one time unit, that the plurality of time units contained in the predicted delay time period are the time units corresponding to the predicted delay time by starting from the default data packet receiving time unit of the SPS period.

In the example of the disclosure, the determining module 201 is configured to determine, in response to determining that a duration from the predicted delay time point to the default data packet receiving time unit of the SPS period is less than the length of one time unit, or that the duration from the maximum predicted delay time point included in the predicted delay time period to the default data packet receiving time unit of the SPS period is less than the length of one time unit, that the default data packet receiving time unit of the SPS period is the time unit corresponding to the predicted delay time.

In the example of the disclosure, the determining module 201 is configured to determine the predicted delay time of the data packet within the SPS period based on a time prediction model, or determine the predicted delay time of the data packet within the SPS period based on a received second indication message.

In the example of the disclosure, the determining module 201 is configured to determine the time prediction model and acquire a historical arrival time of the data packet within the SPS period; and obtain the predicted delay time of the data packet within the SPS period by inputting the historical arrival time of the data packet into the time prediction model for inference.

In the example of the disclosure, the second indication message is received based on uplink control information (UCI) or an MAC control element.

In the example of the disclosure, the configuring module 202 is configured to configure, in response to determining the predicted delay time of arrival of the data packet within one SPS period, the time unit sending the data packet within one SPS period based on the time unit; or configure, in response to determining the predicted delay time of arrival of the data packets within the plurality of SPS periods, the time unit sending the data packet within each SPS period based on the time unit respectively.

In the example of the disclosure, the configuring module 202 is further configured to adjust a configured SPS period in response to that a period of the predicted delay time is different from the configured SPS period.

The sending module 203 is configured to send a first indication message based on DCI or an MAC control element, the first indication message being used for indicating a time unit at which a terminal receives the data packet.

As for the apparatus in the included examples, the specific modes for executing operations by all the modules have been described in the examples related to the method in detail, which is not illustrated in detail here.

Figure 25:
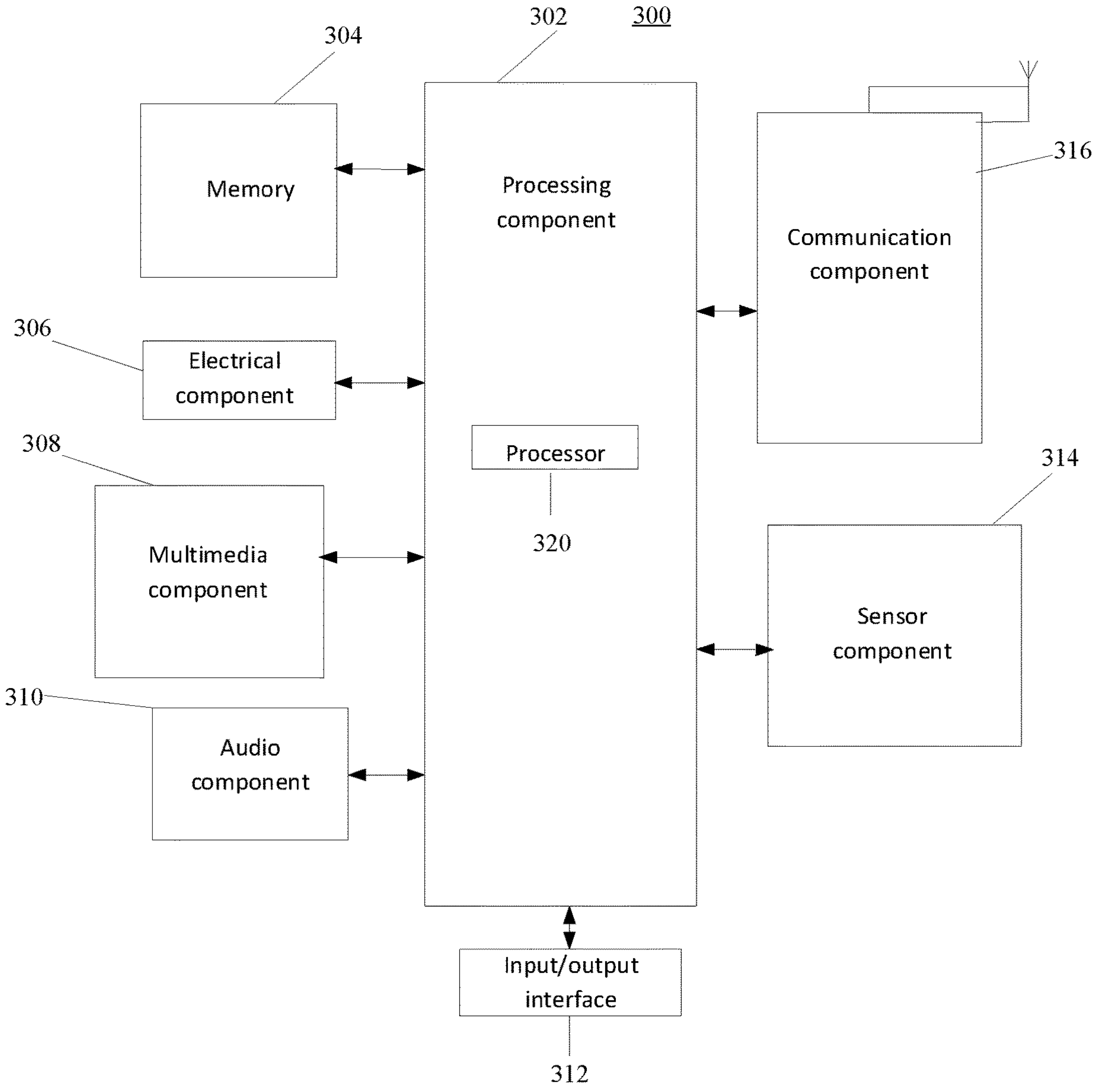
FIG. 25 is a block diagram of an apparatus for SPS configuration shown according to an example.

FIG. 25 is a block diagram of an apparatus 300 for SPS configuration shown according to an example. For example, the apparatus 300 may be a mobile telephone, a computer, a digital broadcast terminal, a message transceiving device, a game console, a tablet device, a medical device, a fitness device, a personal digital assistant, and the like.

Referring to FIG. 25, the apparatus 300 may include one or more of the following components: a processing component 302, a memory 304, an electrical component 306, a multimedia component 308, an audio component 310, an input/output (I/O) interface 312, a sensor component 314, and a communication component 316.

The processing component 302 usually controls an overall operation of the apparatus 300, such as operations associated with displaying, telephone calling, data communication, a camera operation, and a record operation. The processing component 302 may include one or more processors 320 to execute an instruction, so as to complete all or part of the steps of the included methods. In addition, the processing component 302 may include one or more modules (such as those described in FIGS. 23 and 24), so as to facilitate interaction between the processing component 302 and other components. For example, the processing component 302 may include a multimedia module, so as to facilitate interaction between the multimedia component 308 and the processing component 302.

The memory 304 is configured to store various types of data so as to support operations on the apparatus 300. Examples of these data include instructions of any application program or method used to operate on the apparatus 300, contact data, telephone directory data, messages, pictures, videos, and the like. The memory 304 may be implemented by any type of volatile or nonvolatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The electrical component 306 provides electric power for various components of the apparatus 300. The electrical component 306 may include a power management system, one or more power sources, and other components associated with generating, managing, and distributing electric power for the apparatus 300.

The multimedia component 308 includes a screen providing an output interface between the apparatus 300 and a user. In some examples, the screen may include a liquid crystal display (LCD) and a touch panel (TP). In response to determining that the screen includes the touch panel, the screen may be implemented as a touch screen so as to receive an input signal from the user. The touch panel includes one or more touch sensors to sense touching, swiping, and gestures on the touch panel. The touch sensor may not only sense a boundary of a touching or swiping action, but also detect duration and pressure related to the touching or swiping operation. In some examples, the multimedia component 308 includes a front camera and/or a back camera. When the apparatus 300 is in an operation mode, such as a shooting mode or a video mode, the front camera and/or the back camera may receive external multimedia data. Each front camera and each back camera may be a fixed optical lens system or have a focal length and optical zooming capability.

The audio component 310 is configured to output and/or input an audio signal. For example, the audio component 310 includes a microphone (MIC). When the apparatus 300 is in an operation mode, such as a call mode, a recording mode, or a speech recognition mode, the microphone is configured to receive an external audio signal. The received audio signal may be further stored in the memory 304 or sent via the communication component 316. In some examples, the audio component 310 further includes a speaker for outputting the audio signal.

The I/O interface 312 provides an interface between the processing component 302 and a peripheral interface module, and the peripheral interface module may be a keyboard, a click wheel, buttons, etc. These buttons may include, but are not limited to: a home button, a volume button, a start button, and a lock button.

The sensor component 314 includes one or more sensors for providing state evaluations of all aspects of the apparatus 300. For example, the sensor component 314 may detect an on/off state of the apparatus 300 and the relative positioning of components, for example, the components are a display and a keypad of the apparatus 300. The sensor component 314 may further detect position change of the apparatus 300 or one component of the apparatus 300, whether there is contact between the user and the apparatus 300, azimuth or speed up/speed down of the apparatus 300, and temperature change of the apparatus 300. The sensor component 314 may include a proximity sensor, which is configured to detect the existence of a nearby object without any physical contact. The sensor component 314 may further include an optical sensor, such as a CMOS or CCD image sensor, for use in an imaging application. In some examples, the sensor component 314 may further include an acceleration sensor, a gyroscope sensor, a magnetic sensor, a pressure sensor, or a temperature sensor.

The communication component 316 is configured to facilitate wired or wireless communication between the apparatus 300 and other devices. The apparatus 300 may access a wireless network based on a communication standard, such as WiFi, 2G, or 3G, or their combination. In one example, the communication component 316 receives a broadcast signal or broadcast-related information from an external broadcast management system via a broadcast channel. In an example, the communication component 316 further includes a near-field communication (NFC) module so as to facilitate short-range communication. For example, the NFC module may be implemented based on a radio frequency identification (RFID) technology, an infrared data association (IrDA) technology, an ultra wide band (UWB) technology, a Bluetooth (BT) technology, and other technologies.

In the example, the apparatus 300 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements for executing the included methods.

In the example, a non-transitory computer-readable storage medium including instructions is further provided, such as a memory 304 including instructions. The instructions may be executed by a processor 320 of the apparatus 300 so as to complete the included methods. For example, the non-transitory computer-readable storage medium may be a ROM, a random access memory (RAM), a CD-ROM, a magnetic tape, a floppy disk, an optical data storage device, and the like.

Figure 26:
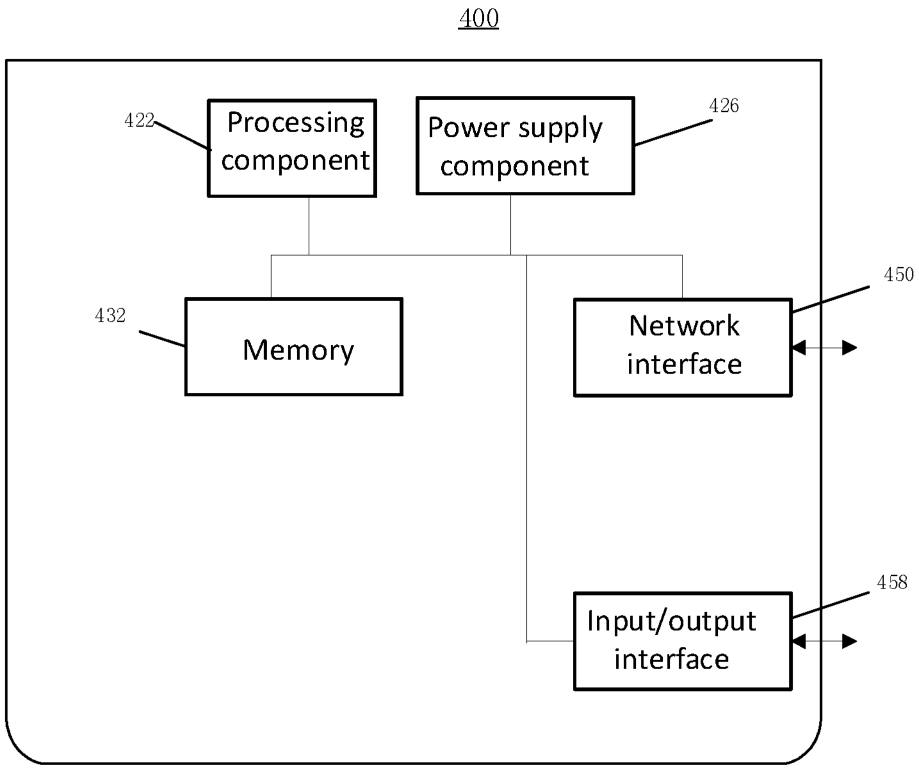
FIG. 26 is a block diagram of an apparatus for SPS configuration shown according to an example.

FIG. 26 is a block diagram of an apparatus 400 for SPS configuration shown according to an example. For example, the apparatus 400 may be provided as a server. Referring to FIG. 26, the apparatus 400 includes a processing component 422, which further includes one or more processors (not shown), and a memory resource represented by a memory 432, for storing instructions executable by the processing component 422, such as an application program. The application program stored in the memory 432 may include one or more modules, each corresponding to a set of instructions. In addition, the processing component 422 is configured to execute the instructions to execute the methods described herein.

The apparatus 400 may further include a power supply component 426 configured to execute power management of the apparatus 400, a wired or wireless network interface 450 configured to connect the apparatus 400 to a network, and an input/output (I/O) interface 458. The apparatus 400 may be operated based on an operating system stored in a memory 432, such as Windows Server™, Mac OS X™, Unix™, Linux™, FreeBSD™, or the like.

It may be further understood that in the disclosure, "plurality of" refers to two or more than two, and other quantifiers are similar. "And/or" describes an association relationship of an association object, and represents that there may be three kinds of relationships, for example, A and/or B, which may represent: A exists alone, A and B exist at the same time, and B exists alone. A character "/" generally represents that the previous and next association objects are in an "or" relationship. The singular forms "a", "the,", and "this" are intended to include the plural forms as well, unless the context clearly indicates otherwise.

It may be further understood that the terms "first", "second," and the like are used to describe various pieces of information, but these pieces of information are not to be limited to these terms. These terms are merely configured to distinguish the same type of information from one another, and do not imply a particular order or a level of importance. In fact, the expressions "first", "second," and the like may be used completely interchangeably. For example, in a case of not departing from the scope of the disclosure, first information may also be called second information, and similarly, the second information may also be called the first information.

It may be further understood that although in the examples of the disclosure, the operations are described in a specific order in the accompanying drawings, it is not to be construed as requiring that the operations are executed in the specific order shown or a serial order, or that all the operations shown are executed to obtain desired results. In certain circumstances, multitasking and parallel processing may be advantageous.

Those skilled in the art will easily figure out other implementation solutions of the disclosure after considering the specification and practicing the invention disclosed here. The present application intends to cover any transformation, usage or adaptive change of the disclosure, and these transformations, usages, or adaptive changes conform to a general principle of the disclosure and include common general knowledge or conventional technical means in the technical field not disclosed by the disclosure. The specification and the examples are merely regarded as being for example, and the true scope and spirit of the disclosure are indicated by the following claim scopes.

It is to be understood that the disclosure is not limited to the exact structure that has been described above and shown in the accompanying drawings, and that various modifications and changes may be made without departing from the scope of the disclosure. The scope of the disclosure is limited merely by the appended claim scope.

What is claimed is:

1. A semi-persistent scheduling (SPS) configuration method, performed by a terminal, comprising:

determining a predicted delay time of arrival of a data packet within at least one SPS period, and determining a time unit corresponding to the predicted delay time; and configuring the time unit to be a time unit receiving the data packet, wherein determining the predicted delay time of the arrival of the data packet within the at least one SPS period comprises:

determining a time prediction model and acquiring a historical arrival time of the data packet within the at least one SPS period; and obtaining the predicted delay time of the arrival of the data packet within the at least one SPS period by inputting the historical arrival time of the data packet into the time prediction model for inference.

2. The SPS configuration method according to claim 1, wherein the predicted delay time is a predicted delay time point; and determining the time unit corresponding to the predicted delay time comprises:

determining, in response to determining the predicted delay time point of the arrival of the data packet within the at least one SPS period and in response to determining that a duration from the predicted delay time point to a default data packet receiving time unit of the at least one SPS period is greater than or equal to a length of one time unit, that a time unit where the predicted delay time point is located is the time unit corresponding to the predicted delay time by starting from the default data packet receiving time unit of the at least one SPS period.

3. The SPS configuration method according to claim 2, wherein determining the time unit corresponding to the predicted delay time comprises:

determining, in response to determining that the duration from the predicted delay time point to the default data packet receiving time unit of the at least one SPS period is less than the length of one time unit, or that a duration from a maximum predicted delay time point comprised in the predicted delay time period to the default data packet receiving time unit of the at least one SPS period is less than the length of one time unit, that the default data packet receiving time unit of the at least one SPS period is the time unit corresponding to the predicted delay time.

4. The SPS configuration method according to claim 1, wherein the predicted delay time is a predicted delay time period; and determining the time unit corresponding to the predicted delay time comprises:

determining, in response to determining the predicted delay time period of the arrival of the data packet within the at least one SPS period and in response to determining that a duration from a maximum predicted delay time point comprised in the predicted delay time period to a default data packet receiving time unit of the at least one SPS period is greater than or equal to a length of one time unit and the predicted delay time period is within one time unit, that a time unit where the maximum predicted delay time point is located is the time unit corresponding to the predicted delay time by starting from the default data packet receiving time unit of the at least one SPS period; or determining, in response to determining the predicted delay time period of the arrival of the data packet within the at least one SPS period and in response to determining that a duration from a maximum predicted delay time point comprised in the predicted delay time period to a default data packet receiving time unit of the at least one SPS period is greater than or equal to a length of one time unit and the predicted delay time period contains a plurality of time units, that the plurality of time units contained in the predicted delay time period are the time units corresponding to the predicted delay time by starting from the default data packet receiving time unit of the at least one SPS period.

5. The SPS configuration method according to claim 1, wherein the first indication message is received based on downlink control information (DCI) or a medium access control control element (MAC CE).

6. The SPS configuration method according to claim 1, wherein configuring the time unit to be the time unit receiving the data packet comprises:

configuring, in response to determining the predicted delay time of the arrival of the data packet within one of the at least one SPS period, the time unit receiving the data packet within one of the at least one SPS period based on the time unit; or configuring, in response to determining the predicted delay time of the arrival of the data packets within a plurality of SPS periods, the time unit receiving the data packet within each of the plurality of SPS periods based on the time unit respectively.

7. The SPS configuring method according to claim 1, further comprising:

adjusting a configured SPS period in response to that a period of the predicted delay time is different from the configured SPS period.

8. The SPS configuring method according to claim 1, further comprising:

sending a second indication message based on uplink control information (UCI) or a medium access control control element (MAC CE), the second indication message being used for indicating a time unit at which a radio access network receives the data packet.

9. A semi-persistent scheduling (SPS) configuration method, performed by a radio access network device, comprising:

determining a predicted delay time of a data packet within at least one SPS period, and determining a time unit corresponding to the predicted delay time; and configuring the time unit to be a time unit sending the data packet, wherein determining the predicted delay time of the data packet within the at least one SPS period comprises:

determining a time prediction model and acquiring a historical arrival time of the data packet within the at least one SPS period; and obtaining the predicted delay time of the data packet within the at least one SPS period by inputting the historical arrival time of the data packet into the time prediction model for inference.

10. The SPS configuration method according to claim 9, wherein the predicted delay time is a predicted delay time point; and determining the time unit corresponding to the predicted delay time comprises:

determining, in response to determining the predicted delay time point of the data packet within the at least one SPS period and in response to determining that a duration from the predicted delay time point to a default data packet receiving time unit of the at least one SPS period is greater than or equal to a length of one time unit, that a time unit where the predicted delay time point is located is the time unit corresponding to the predicted delay time by starting from the default data packet receiving time unit of the at least one SPS period.

11. The SPS configuration method according to claim 10, wherein determining the time unit corresponding to the predicted delay time comprises:

determining, in response to determining that the duration from the predicted delay time point to the default data packet receiving time unit of the at least one SPS period is less than the length of one time unit, or that a duration from a maximum predicted delay time point comprised in the predicted delay time period to the default data packet receiving time unit of the at least one SPS period is less than the length of one time unit, that the default data packet receiving time unit of the at least one SPS period is the time unit corresponding to the predicted delay time.

12. The SPS configuration method according to claim 9, wherein the predicted delay time is a predicted delay time period; and determining the time unit corresponding to the predicted delay time comprises:

determining, in response to determining the predicted delay time period of the data packet within the at least one SPS period and in response to determining that a duration from a maximum predicted delay time point comprised in the predicted delay time period to a default data packet receiving time unit of the at least one SPS period is greater than or equal to a length of one time unit and the predicted delay time period is within one time unit, that a time unit where the maximum predicted delay time point is located is the time unit corresponding to the predicted delay time by starting from the default data packet receiving time unit of the at least one SPS period; or determining, in response to determining the predicted delay time period of the data packet within the at least one SPS period and in response to determining that a duration from a maximum predicted delay time point comprised in the predicted delay time period to a default data packet receiving time unit of the at least one SPS period is greater than or equal to a length of one time unit and the predicted delay time period contains a plurality of time units, that the plurality of time units contained in the predicted delay time period are the time units corresponding to the predicted delay time by starting from the default data packet receiving time unit of the at least one SPS period.

13. The SPS configuration method according to claim 9, wherein the second indication message is received based on uplink control information (UCI) or a medium access control control element (MAC CE).

14. The SPS configuration method according to claim 9, wherein configuring the time unit to be the time unit sending the data packet comprises:

configuring, in response to determining a predicted delay time of arrival of the data packet within one of the at least one SPS period, the time unit sending the data packet within one of the at least one SPS period based on the time unit; or configuring, in response to determining the predicted delay time of arrival of the data packets within a plurality of SPS periods, the time unit sending the data packet within each of the plurality of SPS periods based on the time unit respectively.

15. A semi-persistent scheduling (SPS) configuration apparatus, comprising:

one or more processors; and a memory, configured to store executable instructions of the one or more processors, wherein the one or more processors are collectively configured to:

determine a predicted delay time of arrival of a data packet within at least one SPS period, and determine a time unit corresponding to the predicted delay time; and configure the time unit to be a time unit receiving the data packet, wherein the one or more processors are further collectively configured to:

determine a time prediction model and acquiring a historical arrival time of the data packet within the at least one SPS period; and obtain the predicted delay time of the arrival of the data packet within the at least one SPS period by inputting the historical arrival time of the data packet into the time prediction model for inference.

* * * * *